(12) United States Patent
Wang

(10) Patent No.: US 6,339,708 B1
(45) Date of Patent: Jan. 15, 2002

(54) METHOD AND APPARATUS FOR COMMUNICATIONS RESOURCE ALLOCATION FOR A WIRELESS COMMUNICATIONS SYSTEM

(75) Inventor: Li-Chun Wang, Eatontown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/166,219

(22) Filed: Oct. 5, 1998

Related U.S. Application Data

(63) Continuation-in-part of application No. 08/862,095, filed on May 22, 1997.

(51) Int. Cl.⁷ .................................................. H04Q 7/20
(52) U.S. Cl. ........................ 455/447; 455/450; 455/452
(58) Field of Search ............................... 455/447, 446, 455/448, 67.1, 450, 455, 561, 560, 452

(56) References Cited

U.S. PATENT DOCUMENTS

| | | | | |
|---|---|---|---|---|
| 5,067,147 A | * | 11/1991 | Lee | 455/446 |
| 5,212,830 A | * | 5/1993 | Miller | 455/33.1 |
| 5,247,699 A | * | 9/1993 | Hartman | 455/447 |
| 5,365,571 A | * | 11/1994 | Rha et al. | 455/447 |
| 5,483,667 A | * | 1/1996 | Farugue | 455/447 |
| 5,513,379 A | * | 4/1996 | Benveniste et al. | 455/56.1 |
| 5,537,682 A | * | 7/1996 | Miller | 455/33.1 |
| 5,740,536 A | * | 4/1998 | Benveniste | 455/447 |
| 5,914,946 A | * | 6/1999 | Avidor et al. | 455/448 |
| 6,002,935 A | * | 12/1999 | Wang | 455/447 |
| 6,035,219 A | * | 3/2000 | Brodie | 455/562 |

* cited by examiner

Primary Examiner—William Trost
Assistant Examiner—Tilahun Gesesse
(74) Attorney, Agent, or Firm—Kenyon & Kenyon

(57) ABSTRACT

A method and apparatus for communications resource allocation in a wireless communications system having a total system bandwidth. A service area is divided into a plurality sectors. A first set of base station antennas are positioned within a first set of sectors. The first set of antennas have main beams set at a first set of angles, and each antenna corresponds to a sector within the first set of sectors. A second set of base station antennas are positioned within a second set of sectors adjacent to the first set of sectors. The second set of antennas have main beams set at a second set of angles, and each antenna corresponds to a sector within the second set of sectors. Each sector is assigned a portion of the total system bandwidth.

9 Claims, 24 Drawing Sheets

NBTC (TYPE-I)

NBTC (TYPE-II)

METHOD AND APPARATUS FOR COMMUNICATIONS RESOURCE ALLOCATION FOR A WIRELESS COMMUNICATIONS SYSTEM

CROSS-REFERENCE TO RELATED APPLICATIONS

This application is a C-I-P of U.S. patent application Ser. No. 08/862,095 titled "A Wireless Communications Cellular Architecture For Improving Communications Resource Allocation," filed on May 22, 1997.

FIELD OF THE INVENTION

The invention relates to wireless systems. More particularly, the invention relates to a method and apparatus for assigning communications resources for a wireless communications system.

BACKGROUND OF THE INVENTION

The demand for wireless communications services is on the rise. Cellular telephones are becoming as common as office and residential telephones. Personal Communications Service (PCS) offers the potential to improve existing cellular communications dramatically. Wireless high-speed broadband packet services hold promise for a whole host of new services for work-at-home, telecommuting, local and Internet access.

As a result of the increased popularity of wireless communications services, bandwidth demands for wireless systems providing these services have increased accordingly. Bandwidth refers to the difference between the two limiting frequencies of a band expressed in Hertz (Hz). Bandwidth is a key limiting factor in determining the capacity of the system. The term "capacity" loosely refers to the number of users a system can service, or the amount of information a system can transmit to a user at any one time.

A traditional solution for increasing the bandwidth efficiency in wireless systems is through frequency reuse. Frequency reuse refers to reusing a common frequency band in different cells within the system. The concept of frequency reuse will be discussed in more detail with reference to FIGS. 1 and 2.

FIG. 1 is a diagram of a typical wireless communication system suitable for practicing the present invention. FIG. 1 shows a base station 20 in wireless communication with terminal stations 22. Base station 20 is connected to a Mobile Switching Center (MSC) 26. MSC 26 can be connected to a fixed network, such as the public switched telephone network (PSTN) 24 shown in FIG. 1 or the Internet (not shown). MSC 26 may also be connected to other base stations (not shown). Terminal stations 22 can be either fixed or mobile.

Base station 20 communicates information to/from terminal stations 22 using radio signals transmitted over a range of carrier frequencies. Frequencies represent a finite natural resource, and are in high demand. Moreover, frequencies are heavily regulated by both Federal and State governments. Consequently, each cellular system has access to a very limited number of frequencies. Accordingly, wireless systems attempt to reuse frequencies in as many cells within the system as possible.

To accomplish this, a cellular system uses a frequency reuse pattern. A frequency reuse pattern is determined by taking the total frequency spectrum allotted to the system and dividing it into K sets of frequencies, with each cell having access to one set of frequencies. For example, if the system were allocated 70 MHZ of frequency spectrum, and there were 7 sets of frequencies (K=7), each set would include 10 MHZ worth of the 70 MHZ available to the system (assuming a uniform distribution). Thus, each cell would have access to 10 MHZ worth of the total frequency spectrum allotted to the system.

FIGS. 2(A) through 2(D) illustrate examples of frequency reuse patterns corresponding to K=4, 7, 12 and 19, respectively. A cellular communication system has a number of communication sites located throughout the geographic area served by the system. As shown in FIGS. 2(A) through 2(D), a geographic area can be organized into cells and/or sectors, with each cell typically containing a plurality of communication sites such as a base station and terminal stations. A cell is represented in FIGS. 2(A) through 2(D) as a hexagon. FIG. 2(A) shows a frequency reuse pattern where K=4. Cells are placed into groups of four (referred to as a "cluster"), with each cluster employing one of the frequency sets 1 through 4 (the number within each cell in FIG. 2(A) represents a set of frequencies). This cluster of four cells is then repeated until the entire service area is covered. This same pattern is shown in FIGS. 2(B), 2(C) and 2(D) for clusters of 7, 12 and 19 cells, respectively.

In view of the above, it can be appreciated that the larger the frequency reuse factor (i.e., K), the smaller amount of frequency is available to each cell. This limits the overall capacity of the system, for example, by limiting the number of terminal stations that can communicate within a cell, or the data rates at which each terminal station can send and receive information. Consequently, to the extent that the frequency reuse factor (i.e., K) can be lowered, the more capacity the system has to offer wireless communications services.

A major factor in designing a frequency reuse pattern is the attempt to maximize system capacity while maintaining an acceptable signal-to-interference ratio (SIR). SIR refers to the ratio of the level of the received desired signal to the level of the received undesired signal. Most of the undesired signal is due to co-channel interference. Co-channel interference is interference due to the common use of the same frequency band by two different cells. Thus, to a large extent, co-channel interference determines how often a set of frequencies may be reused throughout the entire system. Accordingly, to the extent co-channel interference can be minimized, the lower the frequency reuse factor (i.e., K).

In an attempt to minimize co-channel interference, conventional systems have separated each cell into multiple sectors, with each sector having a directional antenna co-located with a base station at the center of the cell. The beamwidth of each base station antenna is normally wide enough to cover the whole sector. Typically, a cell is divided into three sectors with each sector having a 120 degree antenna. These cell configurations, however, are unsatisfactory for a number of reasons, which are described with reference to FIGS. 3, 4, and 5.

FIG. 3 is a diagram of a conventional three-sector cell. The cell is represented as a hexagon, with solid lines representing hypothetical cell contours. The term "cell contours" refers to the outline of a cell as well as the lines within a cell which define a sector. The cell has a base station located at the center of the cell, with a directional antenna covering each sector of the cell. The beamwidth of each base station antenna is 120 degrees. The analytical cell contours (i.e., coverage area for each antenna transmission beam) is represented by non-solid lines. As shown in FIG. 3, the analytical cell contours for the front lobe of the antenna transmission beam for sector 1 ("originating sector") forms the shape of an oval. The hypothetical cell contours for sector 1, however, forms the shape of a diamond. As a result, it can be appreciated that the analytical cell contours do not match the hypothetical cell contours. Consequently, the analytical cell contours overlap into the sectors 2 and 3 which are adjacent to sector 1, thereby interfering with the antenna transmission beams for sectors 2 and 3. This type of cell configuration is referred to hereinafter as a wide-beam trisector cell (WBTC).

FIG. 4 illustrates a frequency reuse pattern with K=4 using conventional three-sector cells. Cells are placed into a cluster of four, with each cluster employing one of the frequency sets 1 through 4. This cluster of four cells is then repeated until the entire service area is covered. It can be appreciated that if each cell is a WBTC, the analytical cell contours illustrated in FIG. 3 will overlap not only with sectors adjacent to the originating sector within the same cell, but also to sectors adjacent to the originating sector in other cells (hereinafter collectively referred to as "adjacent sectors"). The increased interference caused by overlapping transmissions increases the frequency reuse factor, thereby decreasing overall cell and system capacity. FIG. 4 also illustrates that the distance (D) between each base station using conventional three-sector cells is 3.5 times the radius (R) of each cell.

FIG. 5 shows the cellular system using the frequency reuse pattern described with reference to FIG. 4 with an additional tier of cells creating co-channel interference for a sector labeled sector 4 located in the middle of the diagram ("FIG. 5 target sector"). FIG. 5 shows the FIG. 5 target sector receiving co-channel interference from four cells, labeled A, B, C and D. This interference, in part, explains why the frequency reuse factor for a conventional system using three sectors is typically K=7.

In light of the foregoing, it can be appreciated that a substantial need exists for a cellular architecture that minimizes the co-channel interference for adjacent sectors and cells, thereby decreasing the frequency reuse factor for a system, thereby increasing the overall capacity of the system.

SUMMARY OF THE INVENTION

These needs and other needs are met by a method and apparatus for communications resource allocation in a wireless communications system having a total system bandwidth. A service area is divided into a plurality sectors. A first set of base station antennas are positioned within a first set of sectors. The first set of antennas have main beams set at a first set of angles, and each antenna corresponds to a sector within the first set of sectors. A second set of base station antennas are positioned within a second set of sectors adjacent to the first set of sectors. The second set of antennas have main beams set at a second set of angles, and each antenna corresponds to a sector within the second set of sectors. Each sector is assigned a portion of the total system bandwidth. This arrangement provides a frequency reuse factor of K≧2 while maintaining acceptable quality of service (QoS) requirements.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
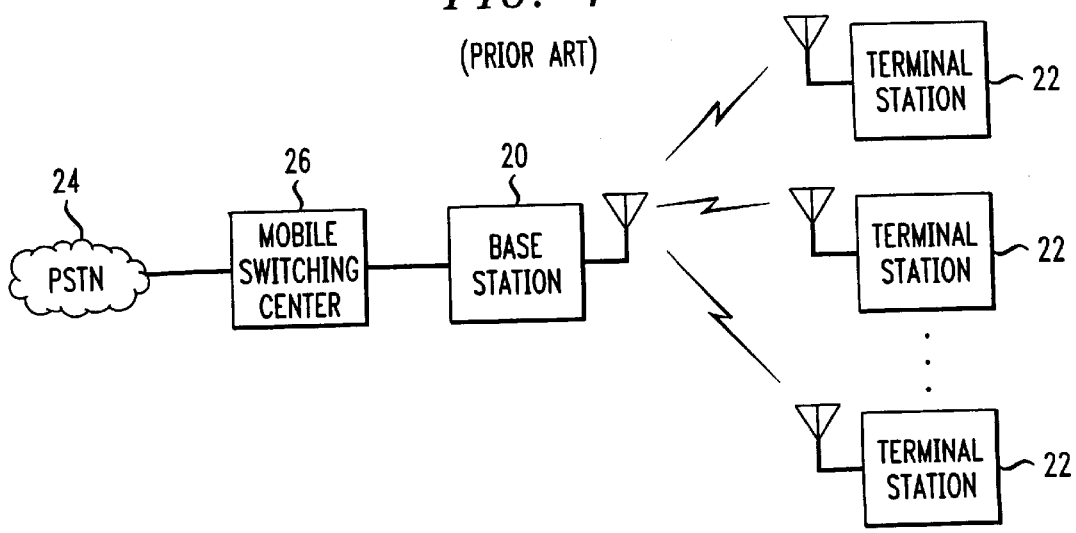
FIG. 1 is a diagram of a typical wireless communication system suitable for practicing the present invention.
Figure 2A:
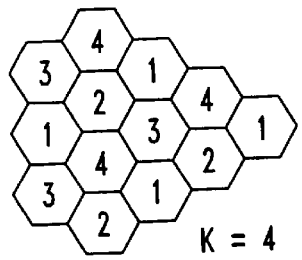
FIGS. 2(A) through 2(D) illustrate examples of frequency reuse patterns corresponding to K=4, 7, 12 and 19, respectively.
Figure 2B:
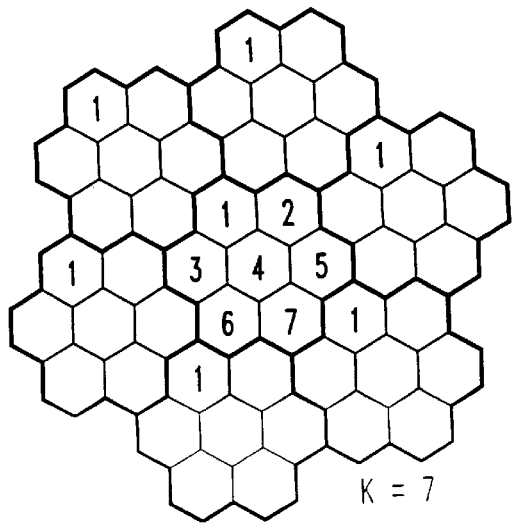
Figure 2C:
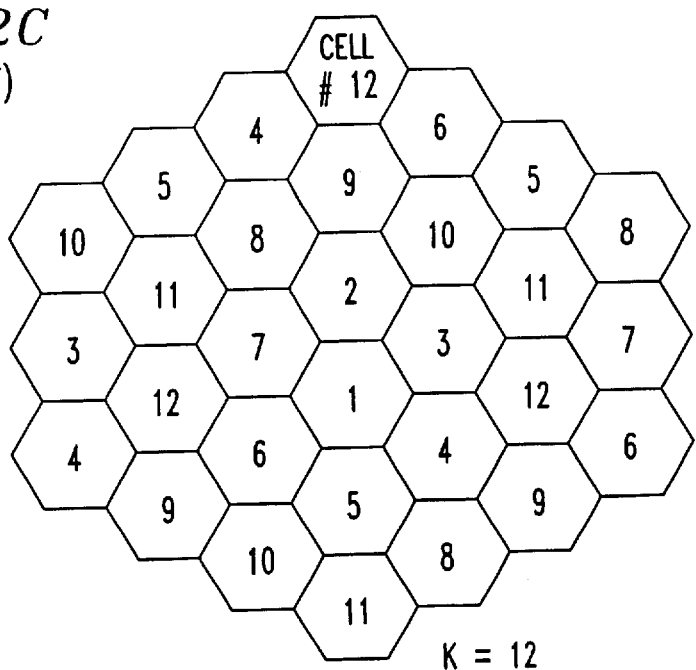
Figure 2D:
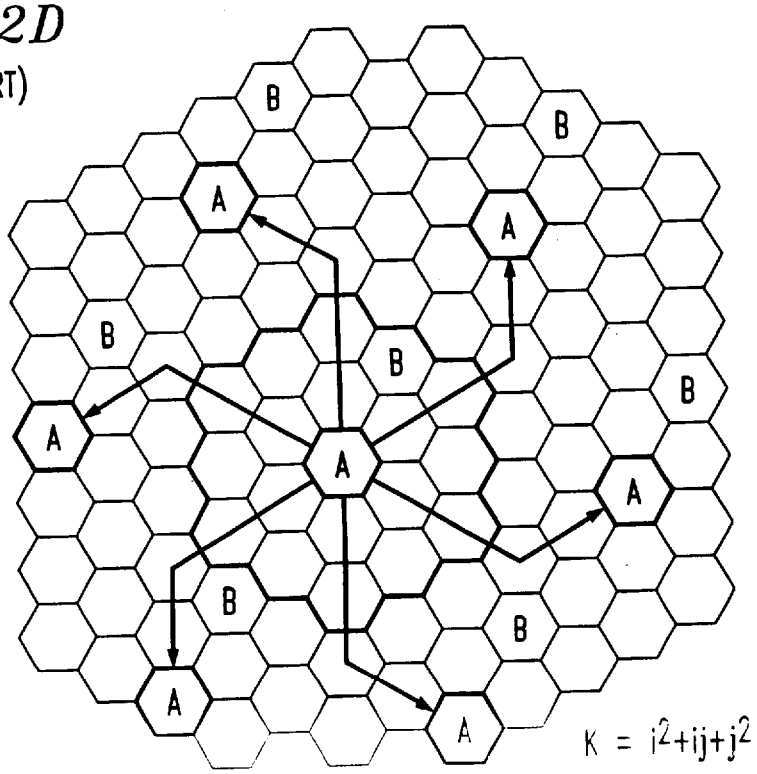

The present invention comprises a cellular architecture and communications resource allocation method and apparatus that significantly reduces a frequency reuse factor for a wireless communications system. The capacity of a conventional cellular system is inversely proportional to the frequency reuse factor (i.e., K) for the system. A frequency reuse factor for conventional systems is typically K=7. The present invention reduces the frequency reuse factor to as low as K=2, thereby tripling the capacity of many existing cellular systems, while maintaining acceptable quality of service (QoS) requirements (e.g., minimum SIR) for most applications.

For those applications having a higher QoS requirement, the principles described herein are also scalable and may be used to achieve a lower frequency reuse factor while providing the required QoS as compared to conventional methods. For example, there exists a digital cellular standard in the United States referred to as Electronic Industries Association (EIA) Standard IS-136, Rev 1.1, "800 MHz TDMA Cellular—Radio Interface—Mobile Station—Base Station Compatability—Digital Control Channel," Oct. 11, 1995 ("IS-136"). IS-136 defines a digital cellular system utilizing a variety of technologies to enhance the capacity of a system, such as using Time Division Multiple Access (TDMA), voice compression using Vector Sum Linear Prediction Coding (VSELP), and digital signaling. IS-136 requires a SIR of 17 dB covering 90% of the area for each IS-136 cell. Conventional systems can only meet this requirement with K=7. A system employing the principles described herein can meet this requirement with only K=4. This constitutes a seventy-five percent increase in channel capacity. Furthermore, this increase comes without the cost of replacing any of the hardware or software requirements for existing cellular systems (e.g., handsets, base stations, mobile telephone switching office, antennas, etc.).

The embodiments of the invention propose a new interleaved narrow beam trisector cell (INBTC) architecture with a new interleaved channel assignment (ICA) scheme to achieve at least three objectives: high spectrum reuse efficiency, high quality channels, and low infrastructure costs. From a "local" perspective, because the INBTC architecture draws from the architecture of certain existing cellular/PCS systems, implementing the architecture can occur without carrying any additional equipment costs.

From a "global" perspective, the INBTC system, combined with the ICA scheme, can enhance performance over the conventional cellular/PCS systems in at least two major ways. First, it delivers higher quality channels in terms of SIR for a given reuse factor and coverage. For a typical range of reuse factors K=3 to 7, the INBTC system improves by 3 to 4 dB at the 90th and 95th SIR percentiles compared to the conventional cellular systems. With a very low reuse factor K=2, the INBTC system achieves 9 dB and 11 dB of SIR with 90% reliability using signal-based site diversity and SIR-based site diversity, respectively. Second, the INBTC system achieves higher frequency reuse efficiency, thus significantly improving system capacity. For a typical cellular environment with $\gamma=4$, $\sigma=8$ dB, and a requirement of 17 dB at the 90th SIR percentile, while the conventional NBTC and WBTC systems require a reuse factor of K=7, the INBTC system can achieve the same performance with a reuse factor K=4, thereby increasing system capacity by 75% over the existing cellular systems.

Furthermore, the INBTC system has more flexibility to select its reuse factor. Specifically, the reuse factor of the INBTC system can be any of the integer values $K \geq 2$. By contrast, the reuse factors of conventional cellular systems using narrow beam trisector cells (NBTC) and wide beam trisector cells (WBTC) architecture usually assume only certain discrete values with $K=i+ij+j^2$ for nonnegative integers i and j, e.g., K=3, 4, 7, 9, 12, etc. Thus, the INBTC system provides additional flexibility in cell engineering without sacrificing network capacity.

The embodiments of the invention use a modified NBTC versus that of a traditional NBTC or WBTC used in conventional systems. A NBTC uses an antenna for each sector having roughly half the beamwidth used in a WBTC. The base station antennas with smaller beamwidths used in a NBTC generate an analytical cell contour that approximates the hypothetical cell contour for each sector. NBTC, therefore, decreases the amount of transmissions from an originating sector that overlap into adjacent sectors. In addition, this embodiment of the invention uses sector rotation to decrease co-channel interference between sectors. Sector rotation minimizes co-channel interference from other cells.

The combination of sector rotation and NBTC yields a frequency reuse factor of as low as K=2. One embodiment of the invention utilizes a cluster of four cells, each having three sectors. The total spectrum available to the system is separated into 6 frequency sets. Each frequency set is used for a single sector, and is reused by a sector in an adjacent cell. As a result, for every cluster of 4 cells, all 6 frequency sets are used twice, thereby creating a frequency reuse factor of K=2.

Figure 3:
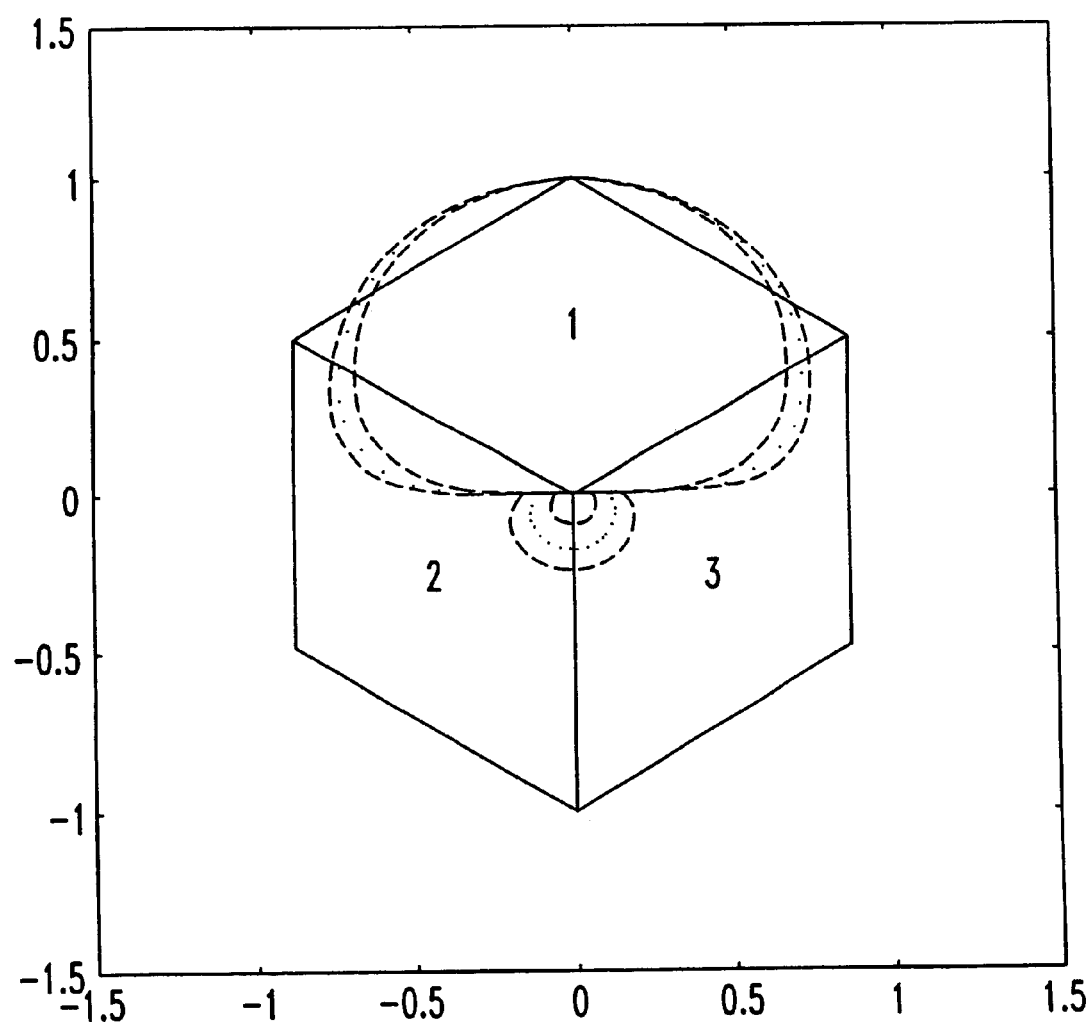
FIG. 3 is a diagram of a conventional three-sector cell.
Figure 6:
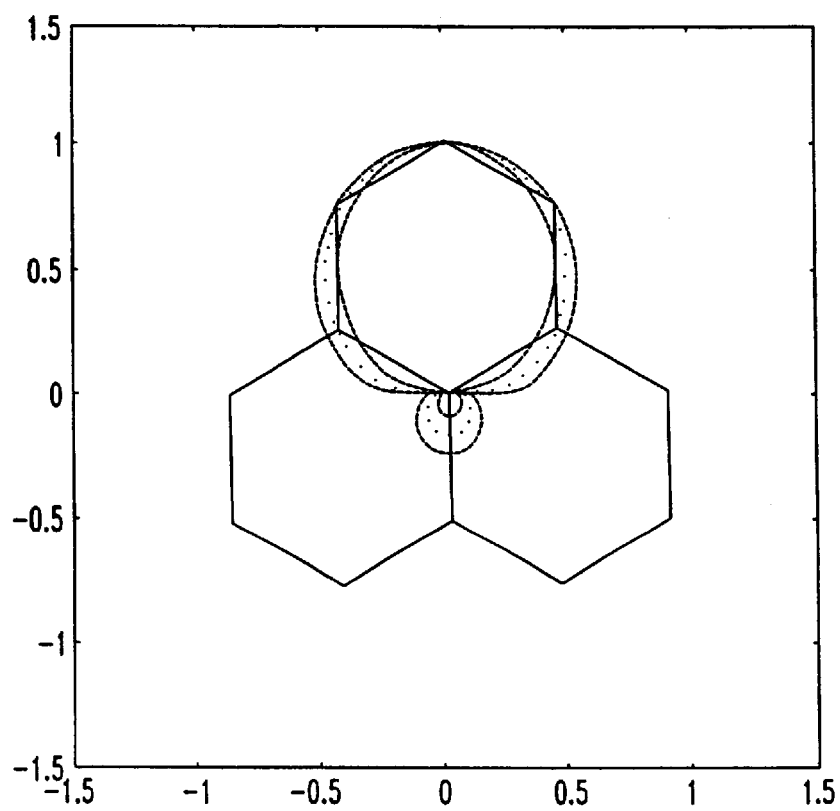
FIG. 6 a three sector cell in accordance with one embodiment of the present invention.

Referring now in detail to the drawings wherein like parts are designated by like reference numerals throughout, there is illustrated in FIG. 6 a three sector cell in accordance with an embodiment of the present invention. As shown in FIG. 6, a hexagon is used to represent the hypothetical contours of a sector rather than an entire cell as in conventional systems. The reason a hexagon is used to represent a sector rather than the entire cell is because a base station antenna may be selected that produces a main transmission beam that better conforms to the shape of a hexagon, rather than a diamond used in conventional systems (as shown in FIG. 3).

More particularly, this embodiment of the invention uses NBTCs. Each NBTC is represented by three hexagons. The hypothetical cell contours are represented as solid lines. The cell has a base station located at the center, with a directional antenna covering each sector of the cell. The beamwidth of each base station antenna is approximately 60 degrees, or roughly half of that used by conventional systems. The analytical cell contours are represented by non-solid lines. As shown in FIG. 6, the analytical cell contours for the front lobe of the antenna transmission beam for sector 1 forms the shape of an oval. Since the hypothetical cell contours for sector 1 is in the form of a hexagon, the analytical cell contours roughly approximate the hypothetical cell contours. As a result, it can be appreciated that the analytical cell contours produce less interference for adjacent sectors as compared to conventional systems using WBTC.

Figure 4:
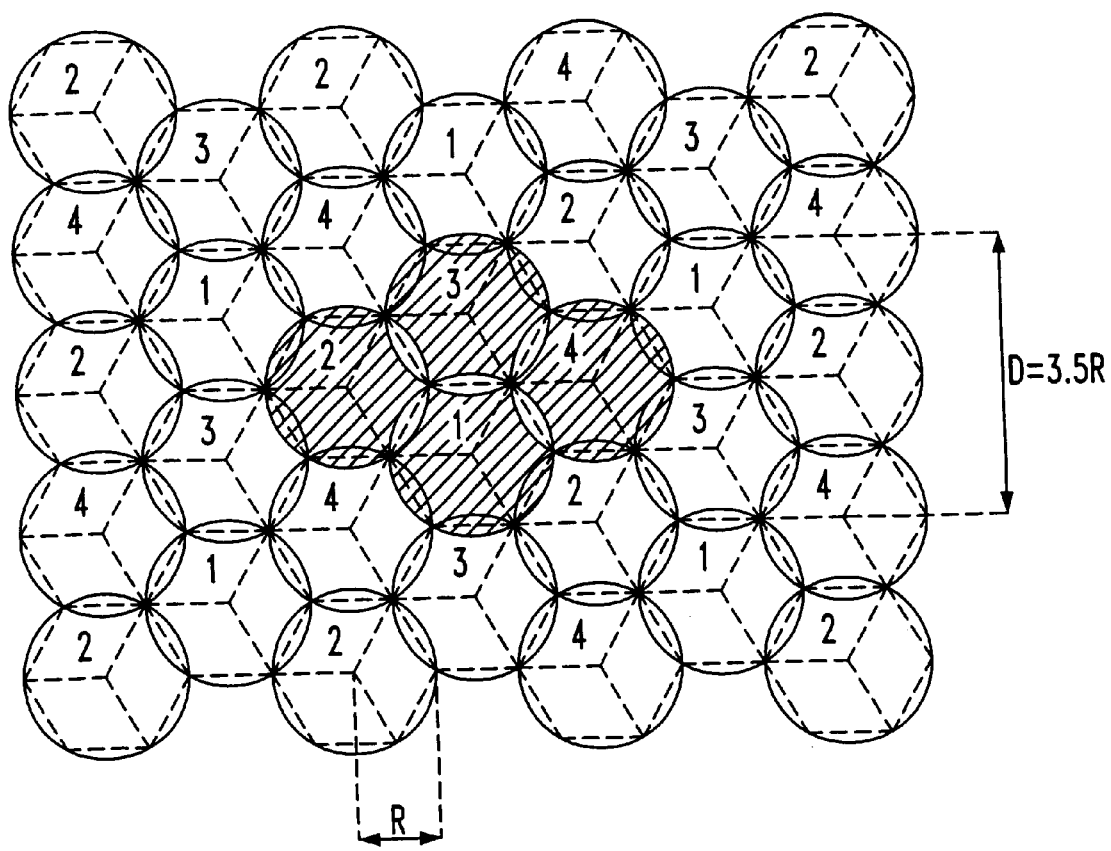
FIG. 4 illustrates a frequency reuse pattern with K=4 using conventional three-sector cells.
Figure 7:
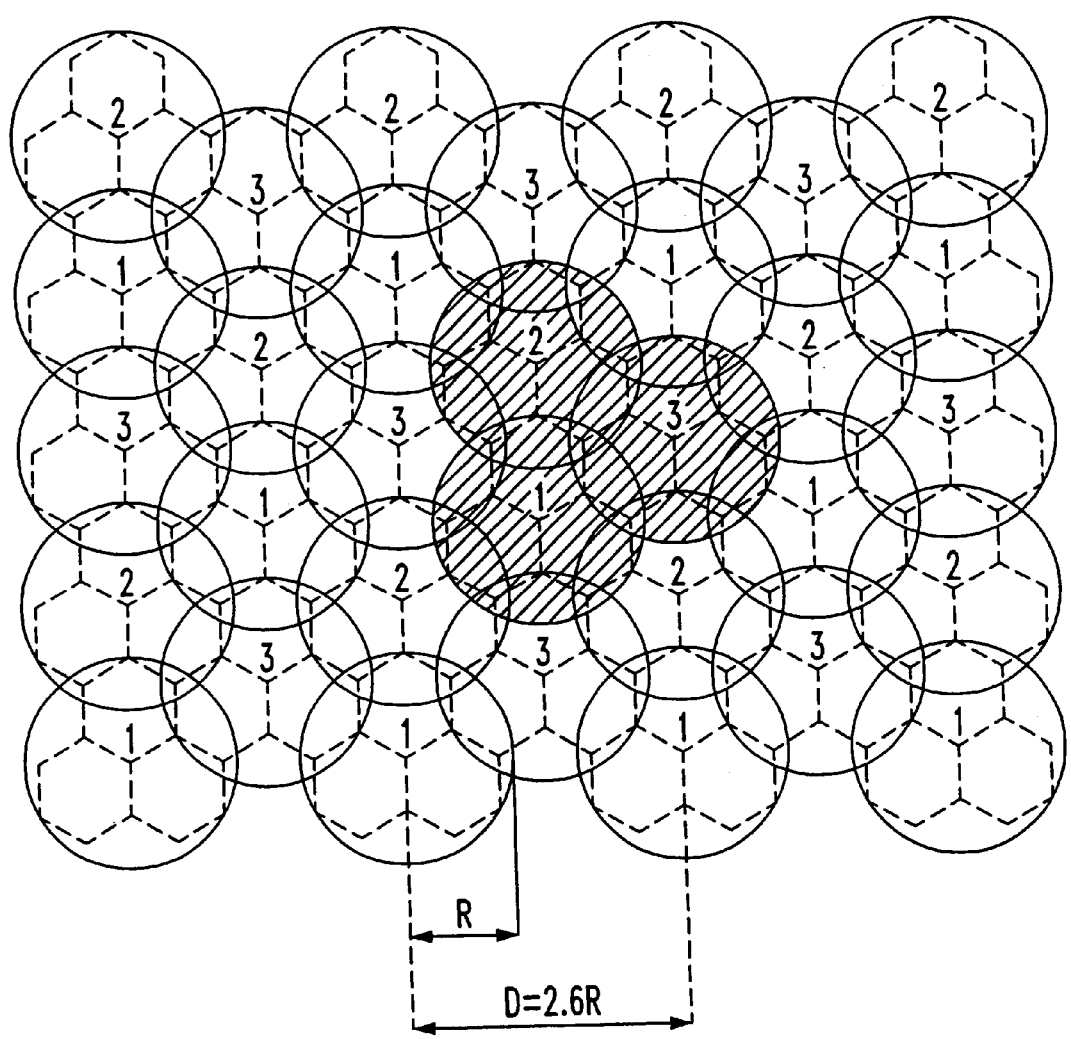
FIG. 7 is a frequency reuse pattern using NBTC in accordance with one embodiment of the present invention.

FIG. 7 is a frequency reuse pattern using NBTC in accordance with a first embodiment of the present invention. As shown in FIG. 7, the distance (D) between each NBTC base station is D=2.6 radius (R), which is less than the distance found in conventional systems such as the one described with reference to FIG. 4 (i.e., D=3.5 R). The decrease in D is a result of the unique configuration of each NBTC which utilizes a hexagon for each sector, thereby permitting the interlocking hexagon sectors to fit close together to create a "tighter" cell pattern. The tighter cell pattern increases the number of cells needed to cover the service area of the system, which in turn increases the number of times a frequency set may be reused, thereby increasing the overall capacity of the system.

Figure 8A:
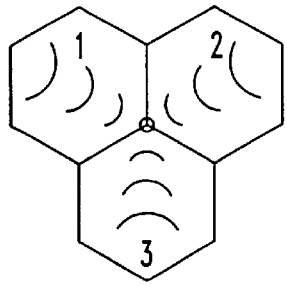
FIG. 8(A) illustrates a first type of NBTC configuration referred to as "NBTC Type-I" in accordance with one embodiment of the present invention.
Figure 8B:
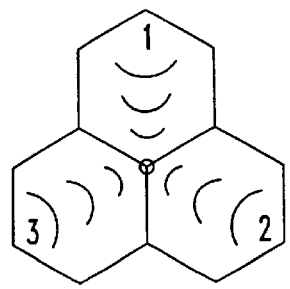
FIG. 8(B) illustrates a second type of NBTC configuration referred to as "NBTC Type-II" in accordance with one embodiment of the present invention.

FIGS. 8(A) and 8(B) illustrate two types of NBTC used in accordance with one embodiment of the invention. FIG. 8(A) illustrates a first type of NBTC configuration referred to as "NBTC Type-I". NBTC Type-I is a cell having three sectors labeled sector 1, sector 2 and sector 3, with each sector being serviced by a directional base station antenna having angles on the main beam of 30 degrees, 150 degrees and 270 degrees, respectively. FIG. 8(B) illustrates a second type of NBTC configuration referred to as "NBTC Type-II". NBTC Type-II is a cell having three sectors labeled sector 1, sector 2 and sector 3, with each sector being serviced by a directional base station antenna having angles on the main beam of 90 degrees, 210 degrees and 330 degrees, respectively. The directional base station antennas all have a beamwidth of approximately 60 degrees to 70 degrees, which is approximately half the beamwidth of 100 degrees to 120 degrees used in conventional systems. It can be appreciated that the antenna angles for NBTC-II are rotated clock-wise approximately 60 degrees from the antenna angles used in NBTC-I. This sector rotation permits each cell to interlock and ensure complete coverage of the service area while minimizing the distance (D) between NBTC base stations, as discussed in more detail with reference to FIG. 9. A system using NBTC Type-I cells interlocked with NBTC Type-2 cells will be referred to herein as an INBTC system.

Figure 8C:
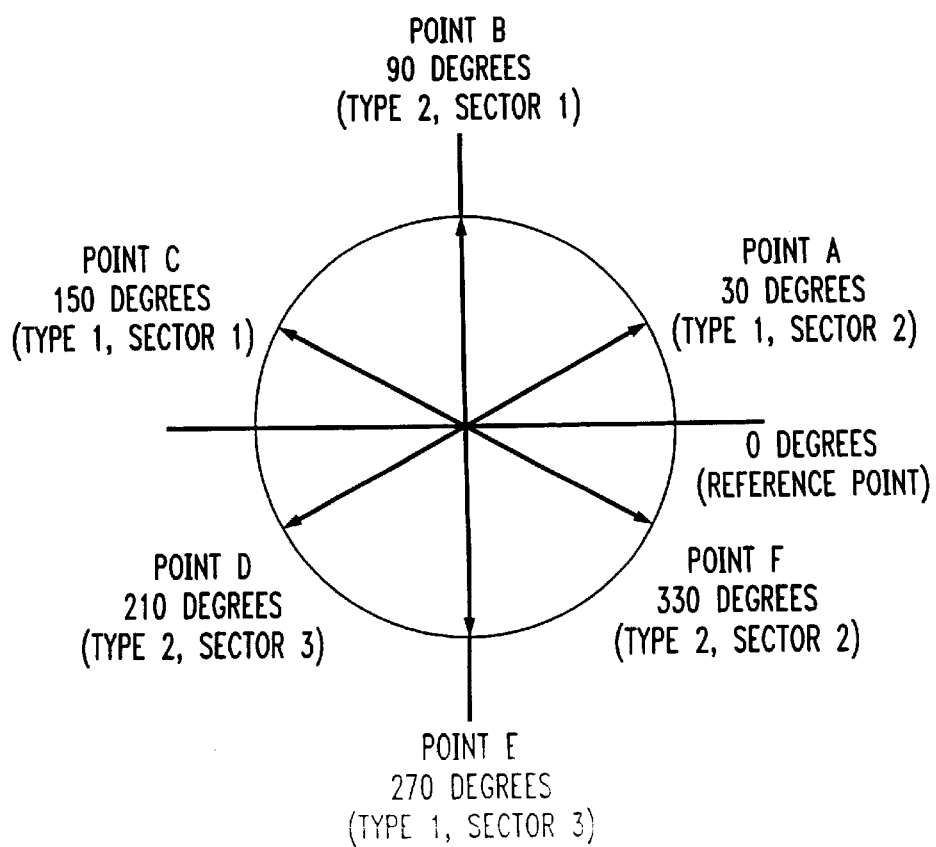
FIG. 8(C) illustrates how the angles for Type I and Type II cells are referenced.

FIG. 8(C) illustrates how the angles for Type I and Type II cells are referenced. The reference point for all angle measurements given herein as illustrative examples of the embodiments of the invention are measured from a reference point of 0 degrees assigned to the horizontal (x) coordinate axis of a cartesian coordinate system in the positive abscissa direction, as illustrated in FIG. 8(C). As shown in FIG. 8(C), from the horizontal axis (0 degrees) to: (1) Point A is approximately 30 degrees which corresponds to the center of Sector 2 of a Type I cell (as indicated in FIG. 8(A)); (2) Point C is approximately 150 degrees which corresponds to the center of Sector 1 of a Type I cell; and (3) Point E is approximately 270 degrees which corresponds to the center of Sector 3 of a Type I cell. It is also shown that from the horizontal axis (0 degrees) to: (1) Point B is approximately 90 degrees which corresponds to the center of Sector 1 of a Type II cell (as indicated in FIG. 8(B)); (2) Point D is approximately 210 degrees which corresponds to the center of Sector 3 of a Type II cell; and (3) Point F is approximately 330 degrees which corresponds to the center of Sector 2 of a Type II cell. It can be appreciated that the diagram given in FIG. 8(C) is an approximation and is used for illustrative purposes only. Further, it can be appreciated that the angles given for both Type I and Type II cells are for illustrative purposes only, and any other angles that maintain approximately 60 degree angles between sectors can be used and still fall within the scope of the invention.

Figure 9:
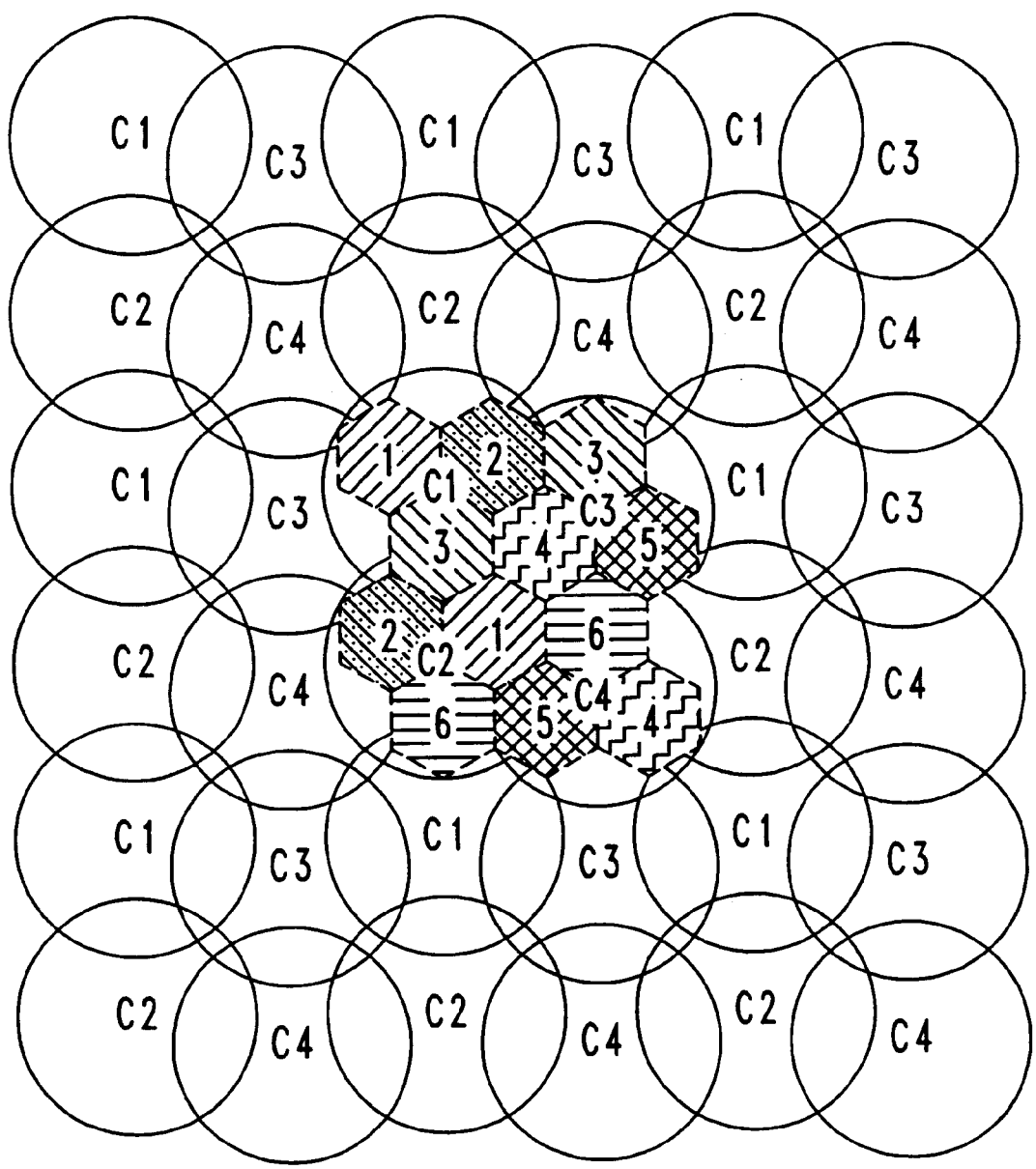
FIG. 9 is a frequency reuse pattern of K=2 using NBTC in accordance with one embodiment of the present invention.

FIG. 9 is a frequency reuse pattern of K=2 using an INBTC system in accordance with a first embodiment of the present invention. This embodiment of the invention utilizes a cluster of four cells labeled C1, C2, C3 or C4. Each cell has three sectors. The total spectrum available to the system is separated into 6 frequency sets. Each sector is assigned a single frequency set from 1 to 6, with each frequency set being reused a second time by a sector in an adjacent cell. As a result, for every cluster of 4 cells, all 6 frequency sets are used twice, thereby creating a frequency reuse factor of K=2.

As shown in FIG. 9, in this embodiment of the invention cell the sectors for cell C1 are assigned frequency sets 1, 2 and 3, the sectors for cell C2 are assigned frequency sets 2, 1 and 6, the sectors for cell C3 are assigned frequency sets 3, 5 and 4, and the sectors for cell C4 are assigned frequency sets 6, 4 and 5. The resulting pattern ensures that there is at least one sector between sectors utilizing the same frequency set, thereby minimizing co-channel interference between sectors. This pattern also ensures that each frequency set is used twice for every cluster of 4 cells, and is repeated throughout the service area for the system. Therefore, on the average, this embodiment of the invention makes every two base stations utilize the whole spectrum, i.e., K=2.

Figure 5:
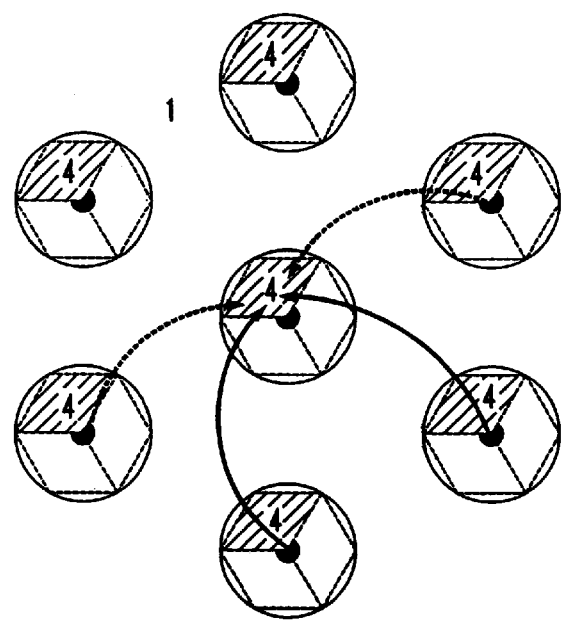
FIG. 5 shows the cellular system using the frequency reuse pattern described with reference to FIG. 4 with an additional tier of cells creating co-channel interference for a sector labeled sector 4 located in the middle of the diagram.
Figure 10:
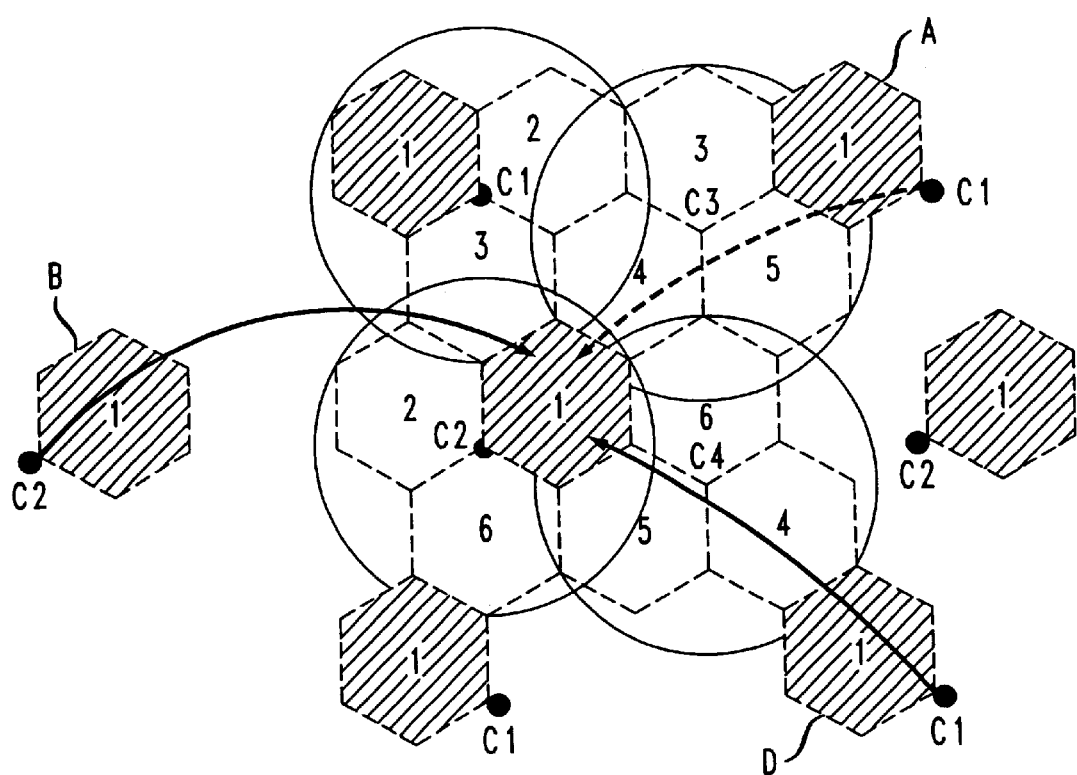
FIG. 10 shows the cellular system of FIG. 9 with an additional tier of cells creating co-channel interference for a sector using frequency set 1 located in the middle of the diagram.

FIG. 10 shows the cellular system of FIG. 9 with an additional tier of cells creating co-channel interference for a sector using frequency set 1 located in the middle of the diagram ("FIG. 10 target sector"). FIG. 10 shows the target sector receiving co-channel interference from three cells, labeled A, B and D. By way of contrast, conventional systems using three sector cells and wide-beam antennas (i.e., 120 degrees) receive co-channel interference from at least four other cells, as shown in FIG. 5. Thus, a cellular system using NBTC receives less interference from other cells within the system, thereby helping to achieve a frequency reuse factor of K=2.

As stated previously, the reuse factor of the INBTC system can be any of the integer values K≧2. The higher the reuse factor, the better SIR for a given coverage area is achieved. This is particularly important for those systems that require a minimum SIR level per cell, such as IS-136. IS-136 requires a SIR of 17 dB covering 90% of the area for each IS-136 cell. An INBTC system having a reuse factor of K=2 provides a SIR of approximately 9 dB covering 90% of the area for each cell. An INBTC system having a reuse factor of K=4, however, provides a SIR of approximately 17 dB, and therefore conforms with the requirements of IS-136. This represents a significant increase over conventional cellular systems that can only provide the requisite SIR with a reuse factor of K=7.

Figure 11:
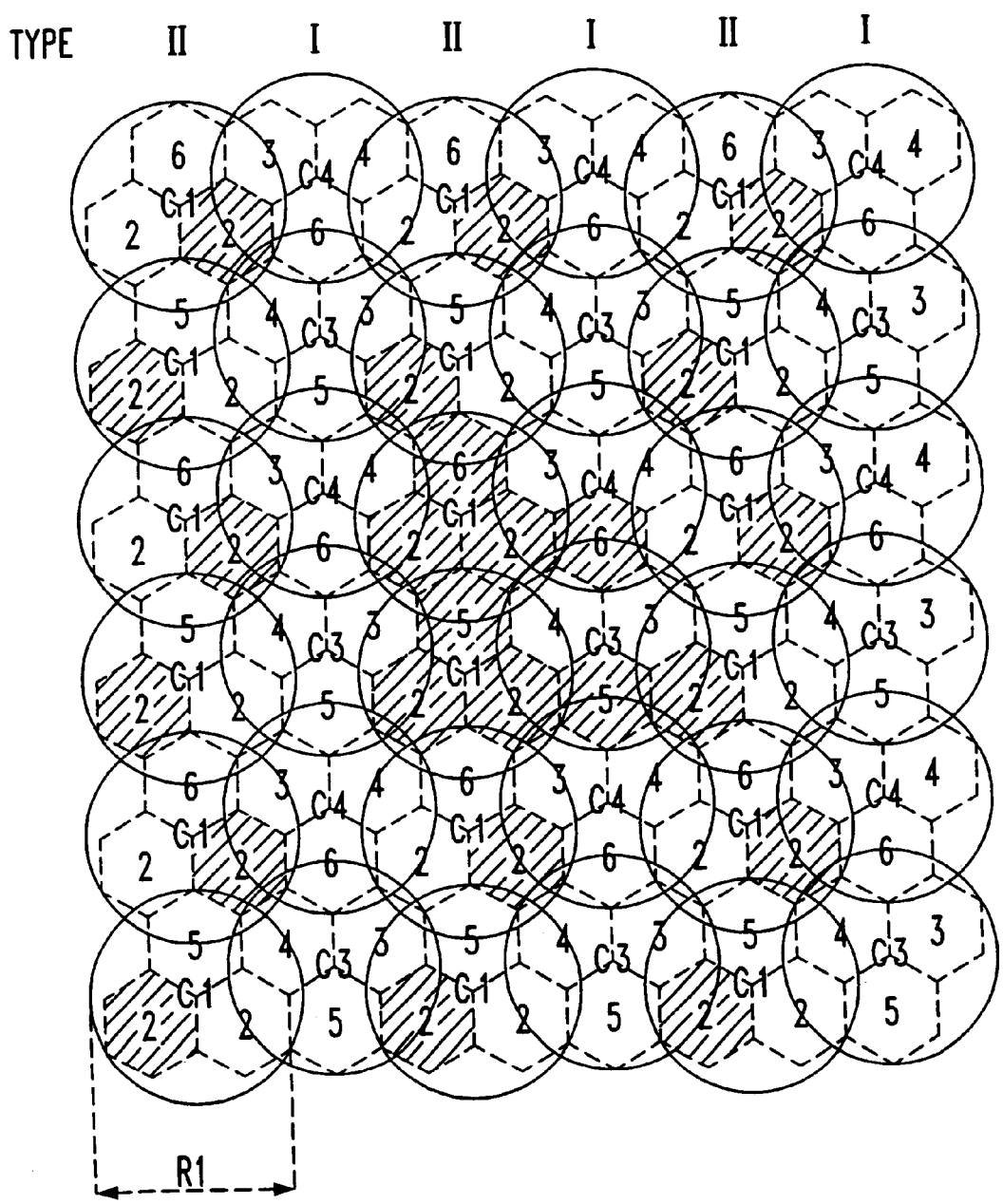
FIG. 11 illustrates a site layout for an INBTC system having a reuse factor of K=2.
Figure 12:
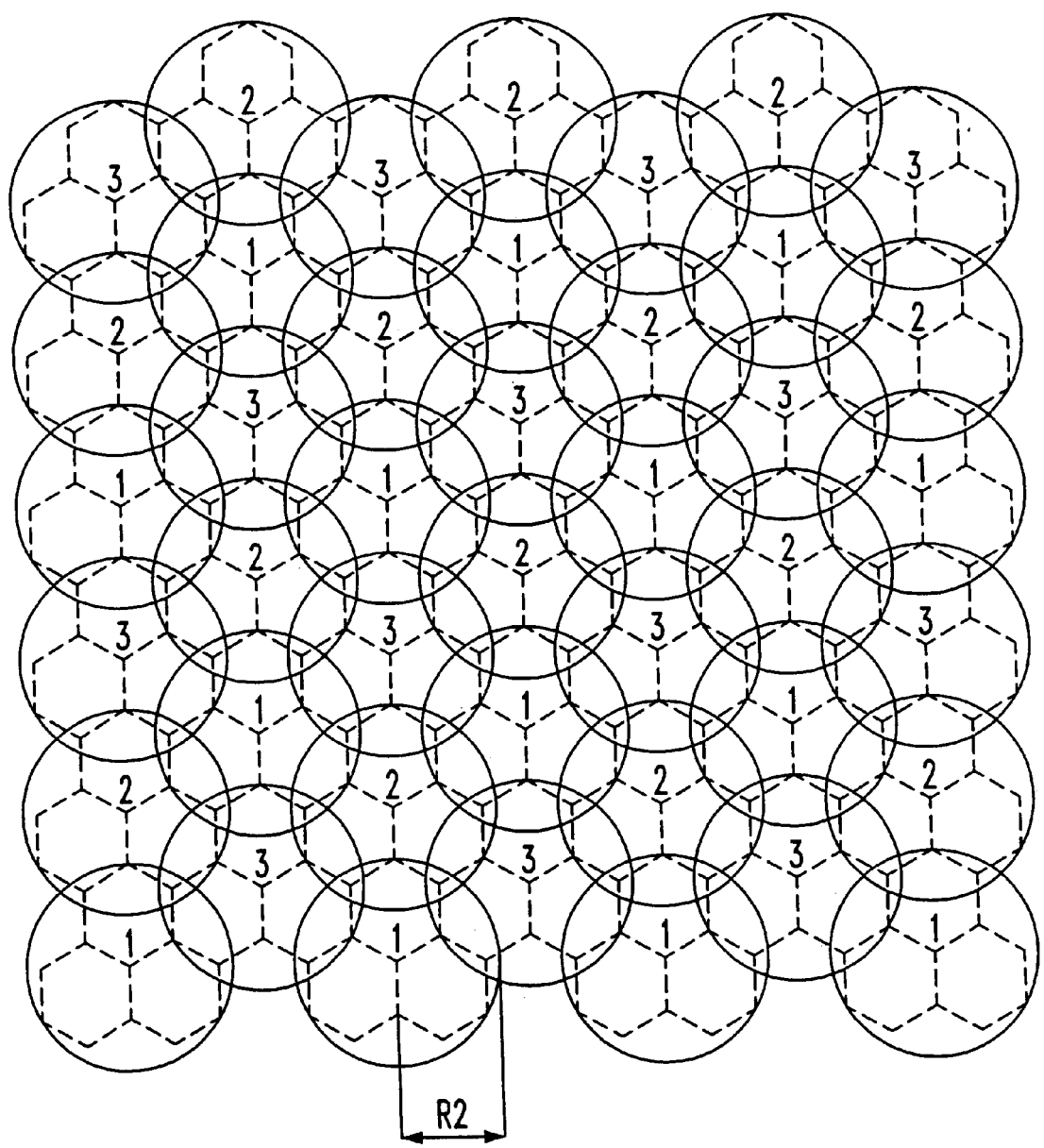
FIG. 12 illustrates a site layout for an NBTC system having a reuse factor of K=3.
Figure 13:
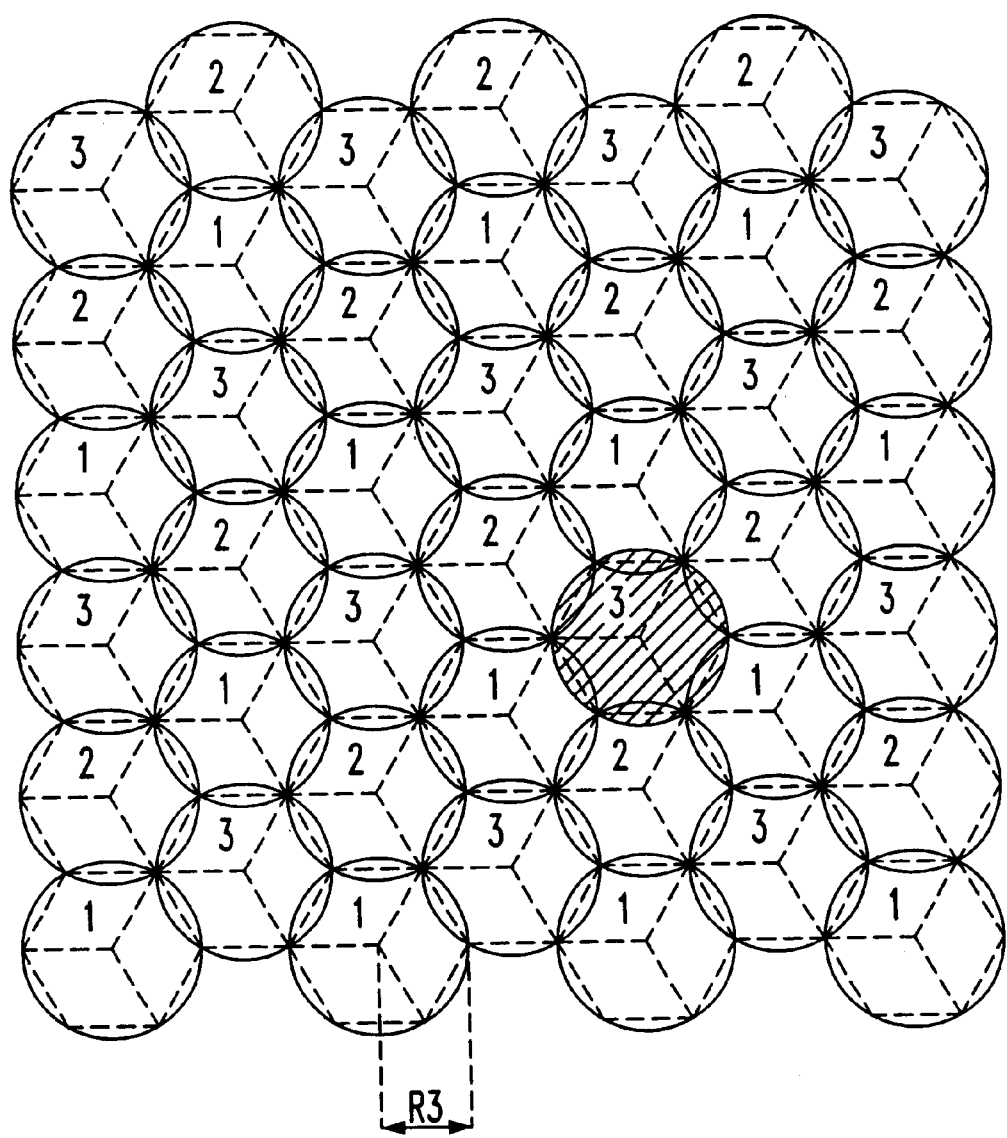
FIG. 13 illustrates a site layout for a WBTC system having a reuse factor of K=3.

FIGS. 11, 12 and 13 illustrate site layouts for INBTC, NBTC and NBTC system, respectively, where the NBTC and WBTC systems have a reuse factor K=3, and the INBTC system has a reuse factor K=2. To maintain the same separation between two adjacent cell sites for the three systems, the relationship among the cell radii of the three architectures is shown in equation (1) as follows:

$$R_1 = R_2 = \frac{2}{\sqrt{3}} R_3$$

where $R_1$, $R_2$, and $R_3$ are the cell radius of the INBTC, NBTC, and WBTC, respectively. Because of this radius difference, to maintain the same received signal strength at the farthest points of an NBTC and a WBTC with the same transmitting power, the base station in an NBTC system needs about 2.5 dB higher antenna gain than that in the WBTC system, assuming a path loss exponent γ=4. This requirement is met because 60 degree antennas usually have 2 to 3 dB higher gains than antennas with 100 degree to 120 degree beamwidth. The relation in equation (1) also implies that the area of each sector is equal for the three systems. Thus, because of the interlocking nature between cells, the INBTC system can still provide as complete coverage as the NBTC and WBTC systems, without increasing cell sites.

According to the classical definition, a cluster is defined as a group of cells to which all channels available to the system are assigned once. Thus, the channel repeat pattern is determined by the cluster, and the cluster size becomes the reuse factor. Previously, the concept of the interleaved cluster as the channel repeat pattern was introduced, within which a channel set can be assigned to more than one sector. Consequently, the generalized reuse factor K is defined in equation (2) as follows:

$$K = \frac{\alpha}{\beta \times \gamma}$$

where $\alpha$ is the number of sectors in the channel repeat pattern; $\beta$ is the number of sectors per cell; and $\gamma$ is the number of times the same channel set is used in the pattern. This definition is more general in the sense that conventional cellular systems restrict $\gamma=1$, whereas the INBTC system allows $\gamma \geq 1$. The definition in equation (2) implies that channel assignment schemes directly determine the channel repeat pattern, the cluster size, and, therefore, the reuse factor.

FIG. 11 is a diagram of an ICA site layout having a frequency reuse factor of K=2. The system described with respect to FIG. 11 is similar to FIG. 9 and is configured to achieve K=2. This system utilizes a cluster of four cells, labeled C1, C2, C3, and C4, each of which has three sectors. The total spectrum available to the system is partitioned into six channel sets. Each sector is assigned with a single channel set from 1 to 6, with each channel set being reused a second time by a sector in an adjacent cell. As shown in FIG. 11, channel sets 1, 2, and 5 are assigned for cell C1; sets 1, 2, and 6 for cell C2; sets 3, 4, and 5 for cell C3; and sets 3, 4, and 6 for cell C4. The resulting pattern yields at least one sector separation between co-channel sectors. Furthermore, the co-channel sectors in a cluster are pointing in different directions so that these sectors will not interfere with each other, thereby minimizing co-channel interference. This pattern is repeated throughout the service area. It also ensures that each channel set is used twice for every cluster of 4 cells (or 12 sectors). From equation (2), we have $\alpha=12$, $\beta=3$, and $\gamma=2$, thereby obtaining a reuse factor K=2.

Figure 14:
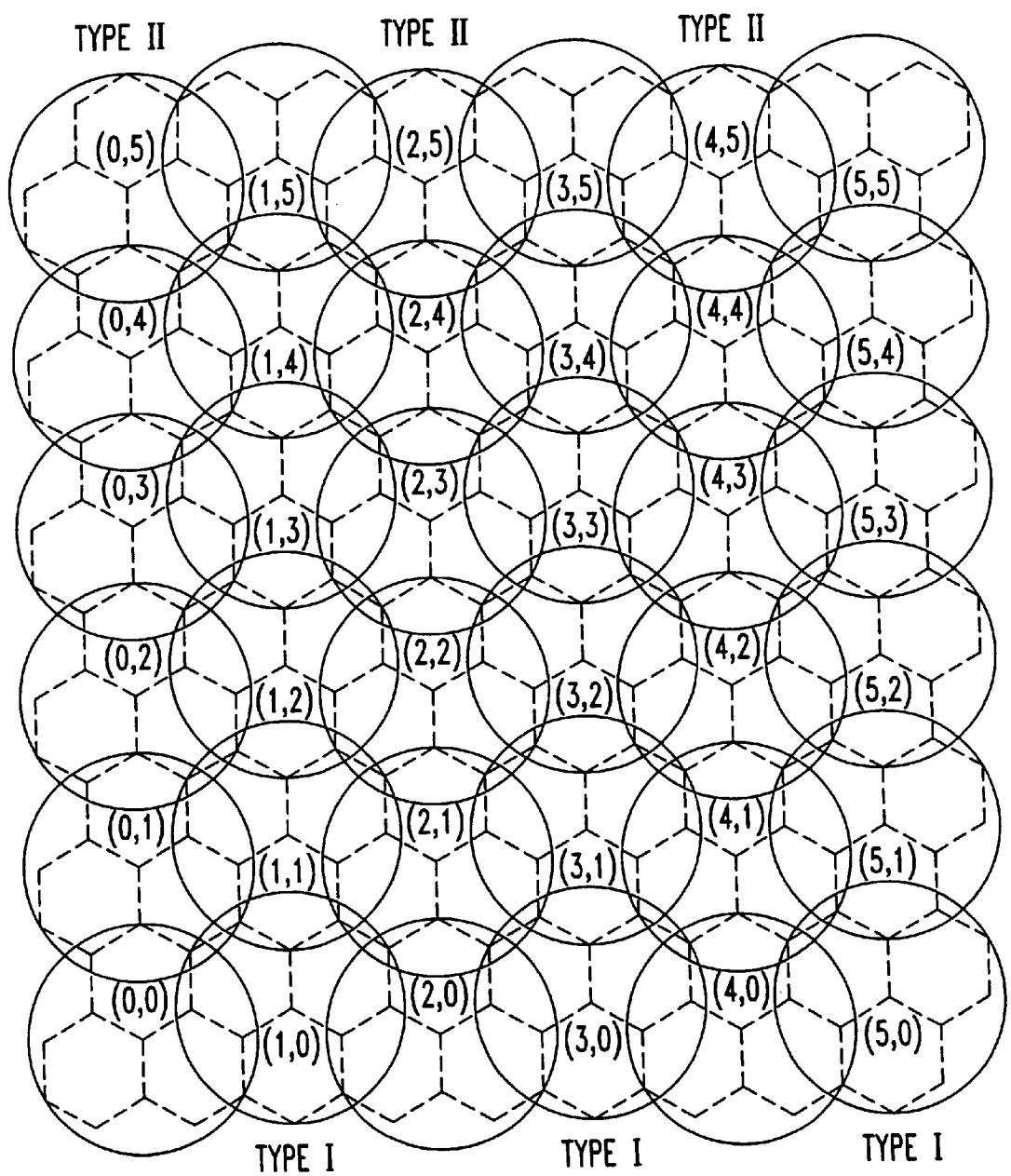
FIG. 14 illustrates a service area in accordance with one embodiment of the invention.

FIG. 14 is an example of a service area for practicing one embodiment of the invention. The following notations are useful in generalizing the above channel assignment for any given integer reuse factors $K \geq 2$. Consider a rectangular coverage area served by an INBTC system with L×M base stations (cells) denoted by C(i,j) for i=0, . . . L−1 and j=0, . . . , M−1. An example with L=M=6 is shown in FIG. 14. It is assumed that type I and II cells are employed at base stations C(i, j) in odd and even-numbered columns (i.e., odd i or even i), respectively. Let S(i, j, k) denote the k-th sector of cell C(i, j).

Using the above notations, the ICA algorithm comprises the following steps:

1. For a given reuse factor $K \geq 2$, divide the whole available frequency spectrum into 3K channel sets, denoted by 1, 2, . . . , 3K.
2. (a) Start from the leftmost column of cells C(i, j) (i.e., i=0).
   (b) Select channel set $\alpha \in \{1, 3, \ldots, 2K-1\}$.
   (c) For j=0 to M−1, assign channel set $\alpha$ to sector S([i/2]), j, k+1) with k=1 if C(i, j) is a type I cell and k=2 otherwise, where [Y] is the largest integer less than Y.
   (d) Move to the next column of cells (i=i+1).
   (e) Select a new channel set $\alpha=\text{mod}(\alpha+2, 2K-1)+1$.
   (f) Assign channel set $\alpha$ based on the rule described in step 2(b), where mod(a, b) is the modular function with modulus b.
   (g) Repeat steps 2(d) to 2(f) until the last column of base stations SL−1, j, k), j=0, . . . , L−1, is assigned with a channel set.
3. (a) Start from the left-most column of cells C (i, j) (i.e.,=0).
   (b) Select channel set $\beta \in \{2, 4, \ldots, 2N\}$.
   (c) For j=0 to M−1, assign channel set $\beta$ to sector S([i/2]−1, j, k) and sector S([i/2]−1, j, k+1) with k=1 if C(i, j) is a type I cell and k=2, otherwise, where [Y] is the largest integer less than Y.
   (d) Move to the next column of cells (i=i+1).
   (e) Select a new channel set $\beta=\text{mod}(\beta+2; 2K)+1$.
   (f) Assign channel set $\beta$ based on the rule described in Step 3(c).
   (g) Repeat steps 3(d) to 3(f) until the last column of base stations S(L−1, j, k), j=0, . . . , L−1, is assigned with a channel set.
4. (a) Start from the lowest row of cells C(i, j) (i.e., j=0).
   (b) Select channel set $\gamma \in \{2K+1, \ldots, 3K\}$.
   (c) For i=0 to L−1, assign channel set $\gamma$ to sector S(i, j, 1) and sector S(i, j, 3).
   (d) Move to the next row of cells (j=j+1).
   (e) Select a new channel set $\gamma=\text{mod}(\gamma+1, K)+2K+1$.
   (f) Assign channel set $\gamma$ based on the rule described in Step 4(c).
   (g) Repeat steps 4(d) to 4(f) until the last row of base stations S(M−1, j, k), j=0, . . . , L−1, is assigned with a channel set.

Figure 15:
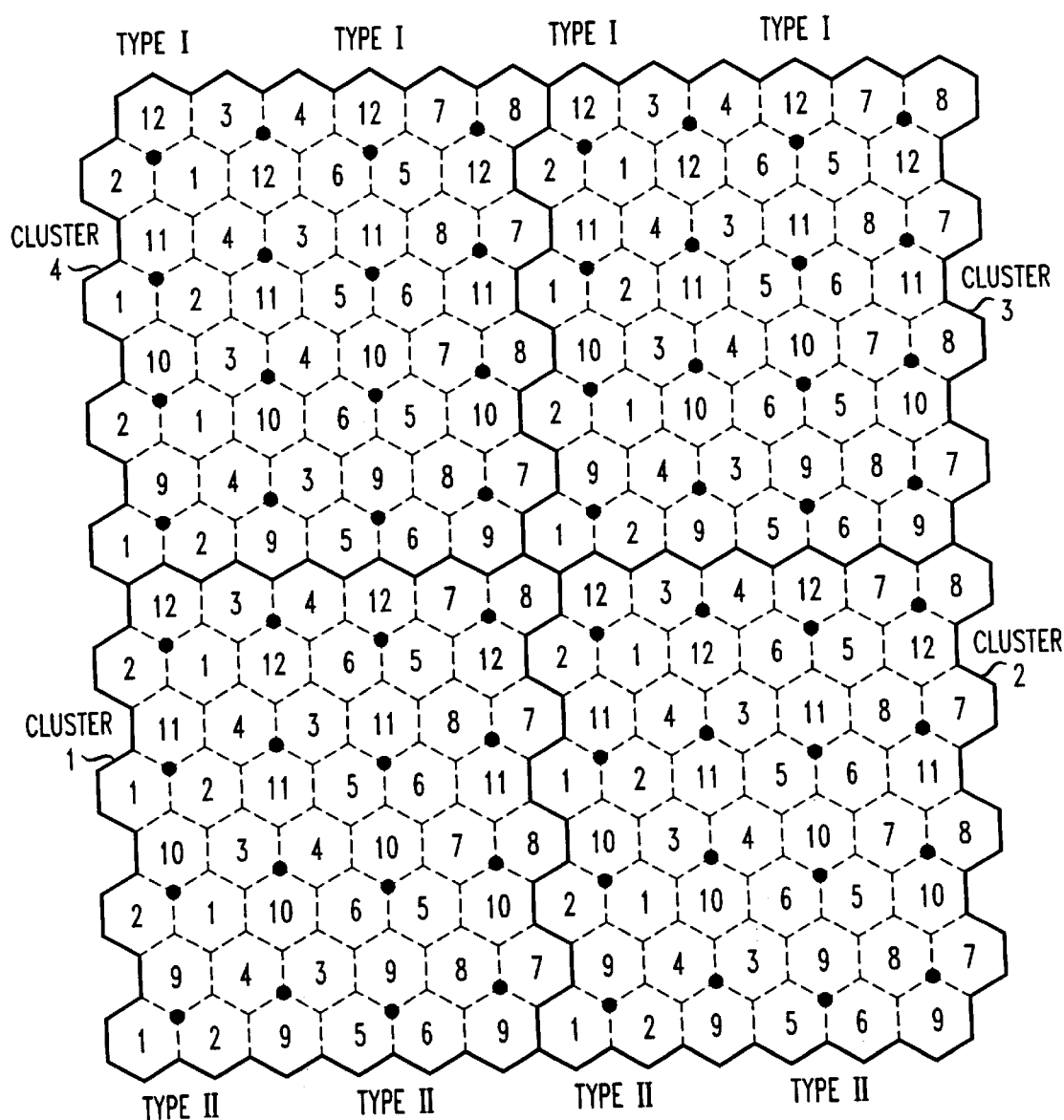
FIG. 15 illustrates a site layout and channel set assignments for an INBTC system having a reuse factor of K=4.
Figure 16:
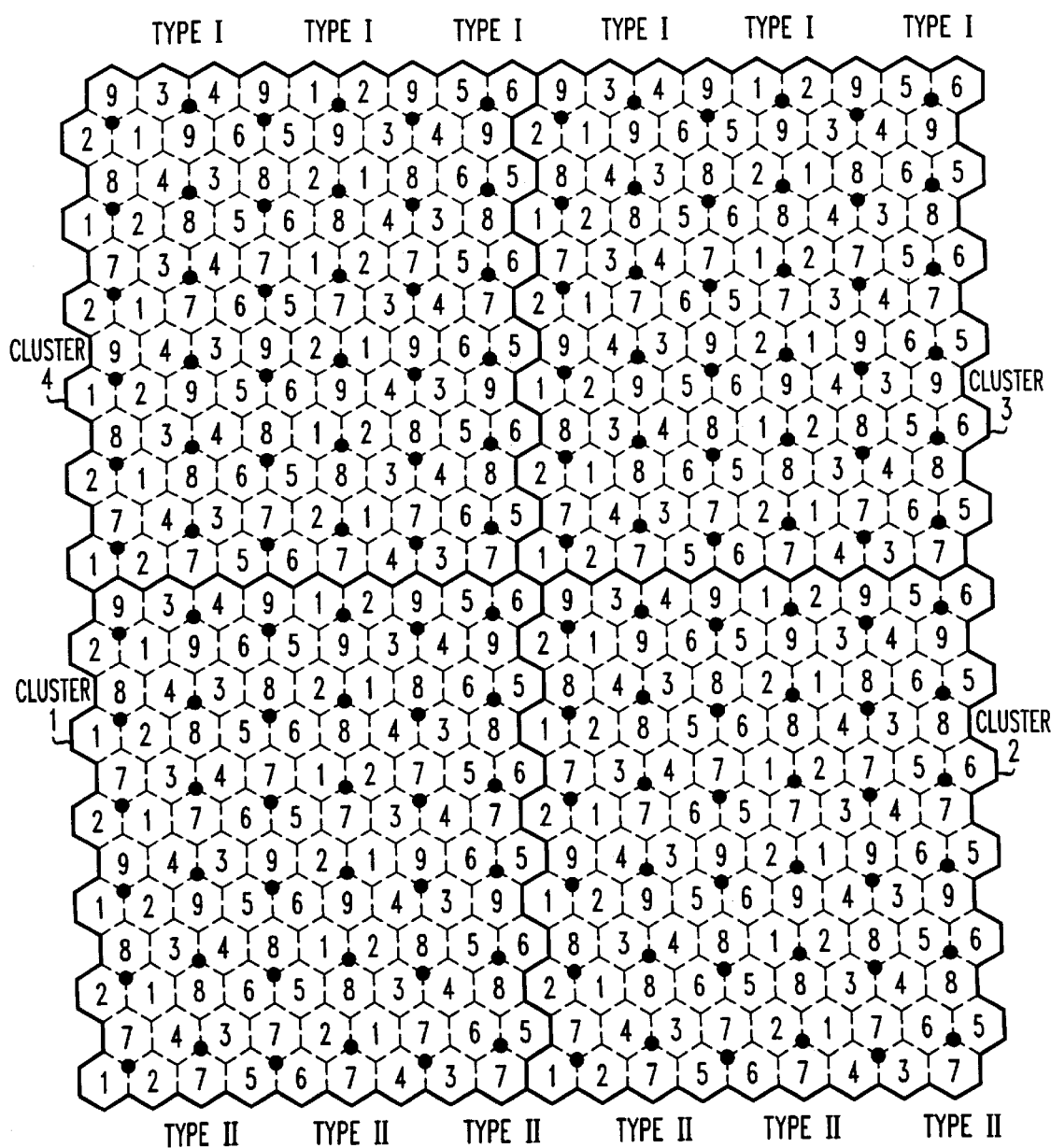
FIG. 16 illustrates a site layout and channel set assignments for an INBTC system having a reuse factor of K=3.

FIGS. 15 and 16 illustrate site layouts and channel set assignments for INBTC systems having K=4 and K=3, respectively. For K=3, observe from FIG. 16 that a channel repeat pattern is formed in a cluster of 36 cells (or equivalently, 108 sectors) located on an approximately square grid. Within these 108 sectors, each of 9 channel sets is reused 12 times, thereby yielding the reuse factor K=3 from equation (2). For another example, FIG. 15 presents a pattern in a cluster of 16 cells (48 sectors), in which each of 16 channels sets is reused 4 times, thus yielding K=4.

As seen from above, an INBTC system with the ICA scheme requires 3K channel sets for a given reuse factor K. If K is an odd integer, the repeat pattern of the whole channel sets is formed in a cluster of $4K^2$ cells, within which the total channel sets available to the system are reused 4K times. On the other hand, if K is an even integer, a cluster of $K^2$ cells form a repeat pattern of the whole channel set, within which the total channel set is used K times. The ICA scheme ensures that any two co-channel sectors are separated by at least a sector and the main beams of the nearest two co-channel sectors are pointing in two different directions so that they will not interfere with each other. Thus, the INBTC system simultaneously achieves high reuse efficiency and low interference.

A performance analysis compares the performances of the WBTC, NBTC, and INBTC systems based on a worst case analysis. The performance criteria includes a coverage probability, or reliability function, which is defined as:

$$P(\lambda_{th}) \triangleq \text{Prob}[S/I > \lambda_{th}],$$

where S and I are the local mean of the desired received power and the total interference power, respectively. We have $$I = \sum I_i$$

where $I_i$ is the received power from the i-th individual interferer and n is the number of active co-channel interferers. It should be noted that for studying SIR performance, the effects of receiver thermal noise is ignored. For a given air interface, if the required (or threshold) value of SIR for good reception is $\lambda_{th}$, then $P(\lambda_{th})$ is the coverage probability, or reliability, for that interface, and $[1-P(\lambda_{th})]$ is the outage probability.

Assuming that all sectors transmit at the same power, the signal-to-interference ratio for a given user can be expressed as:

$$\frac{S}{I} = \left[\sum_{i=1}^{n}\left(\frac{G_i(\theta_i)}{G(\theta_0)}\right)\left(\frac{d_i}{d_0}\right)^{-\gamma}\left(\frac{\omega_i}{\omega_0}\right)\right]^{-1}$$

where $\theta_i$ is the angles to the main beam of a directional antenna; $G(\theta_i)$ is the antenna gain at angle $\theta_i$ in dB; $d_i$ is the distance of the i-th interferer to the user; $\omega$ is the shadow fading variable (10 log($\omega$) is a Gaussian random variable with zero mean and standard deviation a); the subscript 0 corresponds to the user (desired signal); and i=1, . . . , n are the indices for the active co-channel interferers. The impact of sidelobe and backlobe interference in this study is included by assuming realistic radiation patterns of directional antennas, from which FIGS. 3 and 6 are produced.

Figure 17:
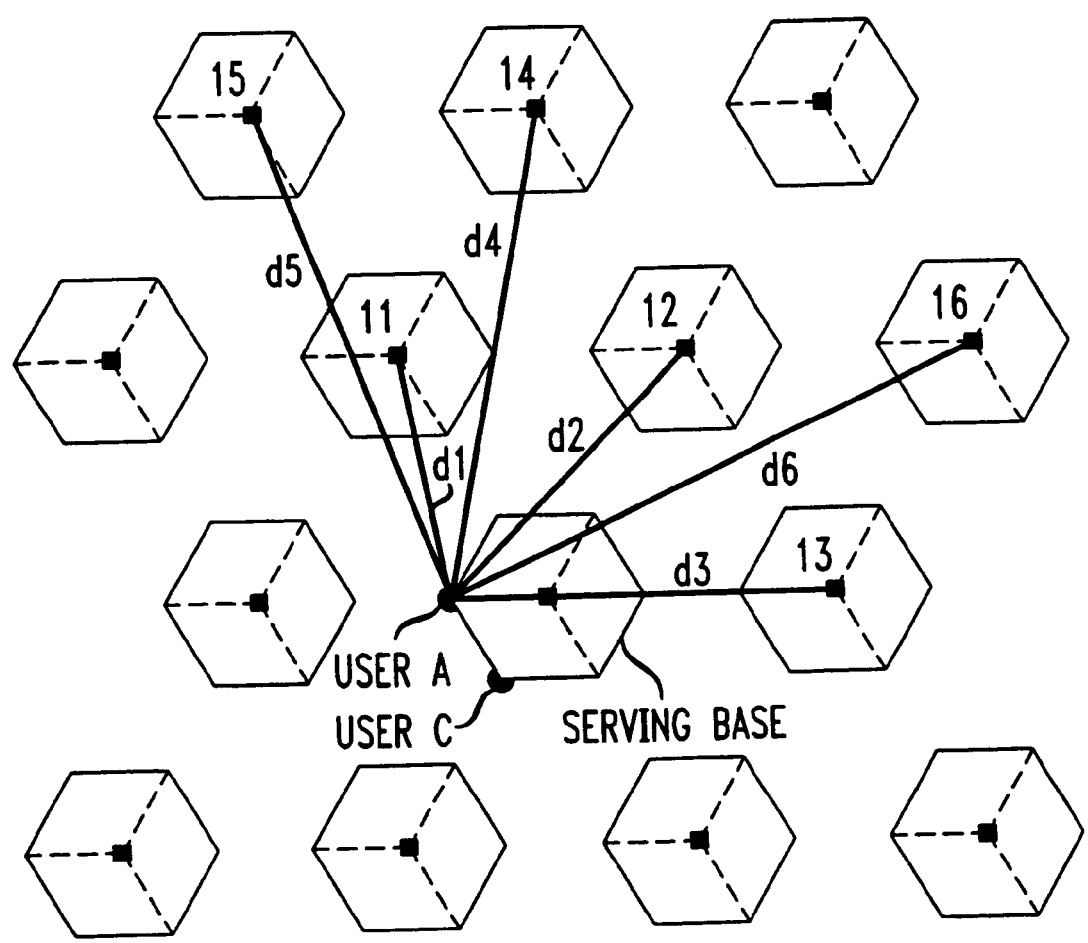
FIG. 17 illustrates the worst co-channel interference scenario for the WBTC system having a reuse factor of K=3 where a user is at the cell boundary of a serving base station.
Figure 18:
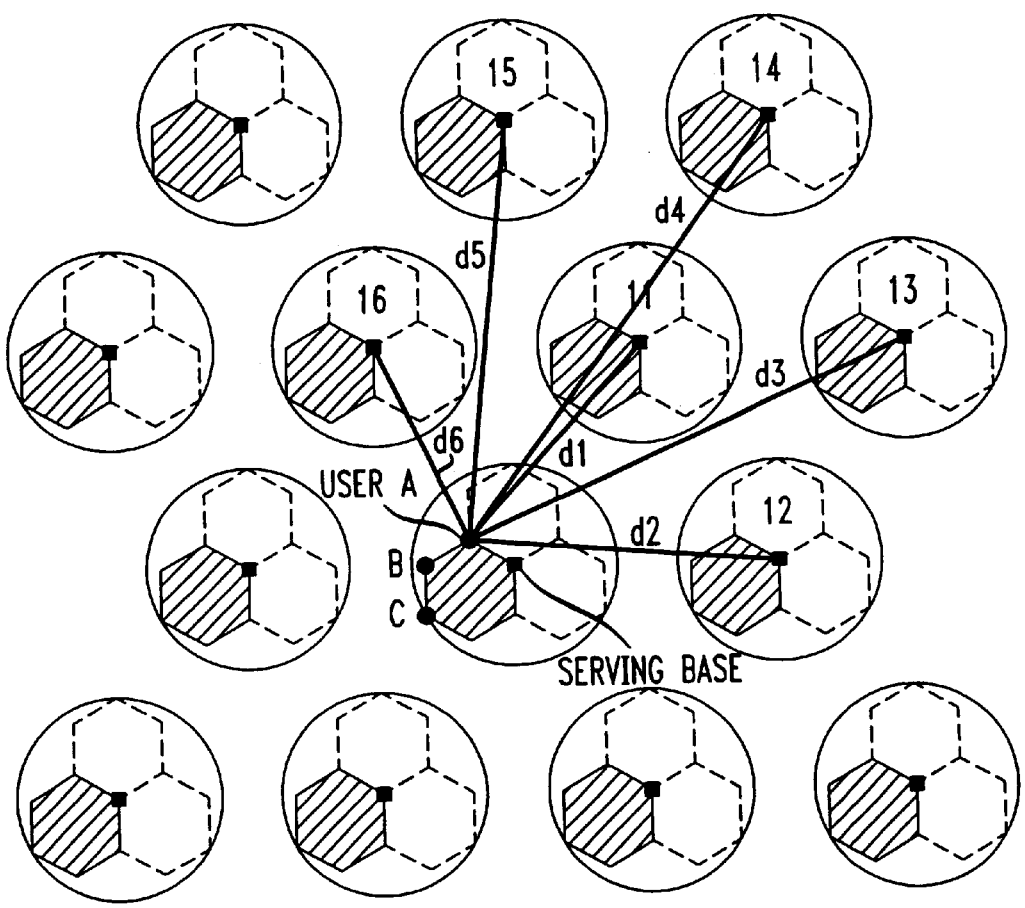
FIG. 18 illustrates the worst co-channel interference scenario for the NBTC system having a reuse factor of K=3 where a user is at the cell boundary of a serving base station.
Figure 19:
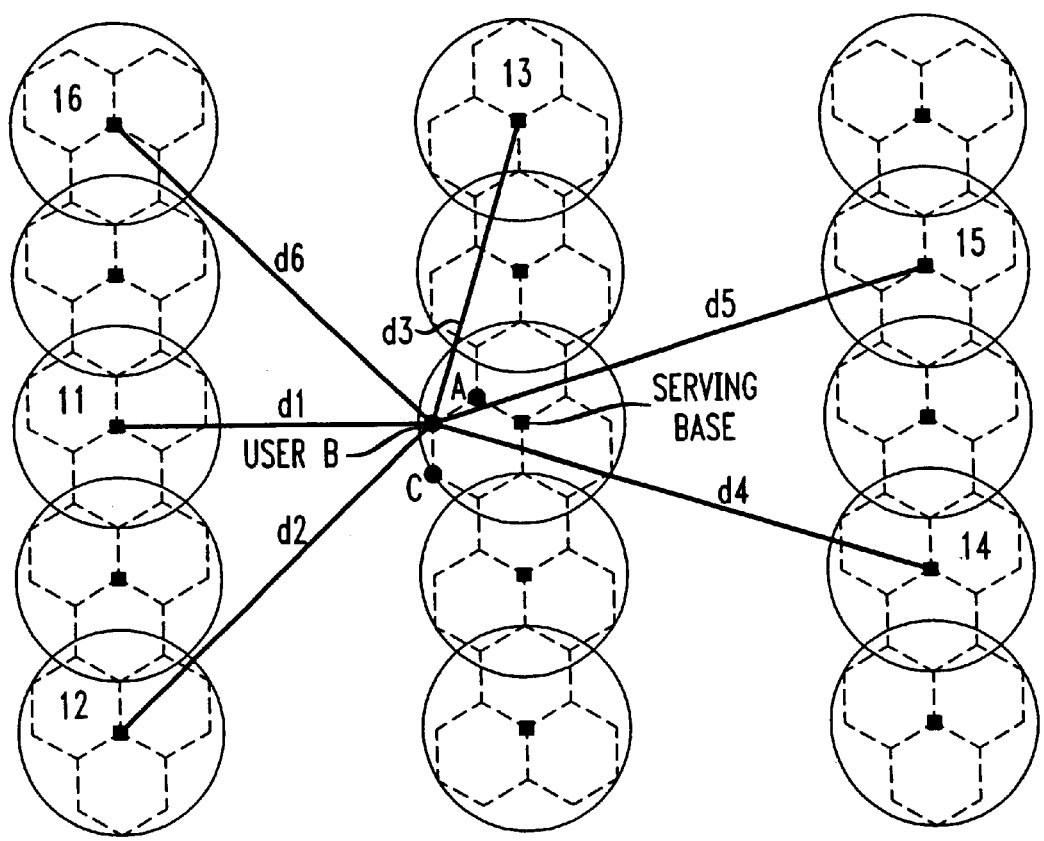
FIG. 19 illustrates the worst co-channel interference scenario for the INBTC system having a reuse factor of K=3 where a user is at the cell boundary of a serving base station.

Neglecting the shadowing effect, the worst case co-channel interference scenarios for the WBTC, NBTC and INBTC systems with K=3 are shown in FIGS. 17, 18 and 19, respectively, where a user is at the cell boundary of a serving base station. The locations of interfering base stations in the figures are obtained from FIGS. 13, 14 and 16. Assume the dominant sources of interference come from the strongest six co-channel interfering cells,

TABLE I

|  | $d_i/R$ | $\theta_i$ (deg) | $G(\theta_i)$ (dB) | $(d_i/R)^{-\gamma} \times 10^{G(\theta i)/10}$ |
|---|---|---|---|---|
| $I_1$ | 2.65 | 40 | −1.16 | 1.56 × 10$^{-2}$ |
| $I_2$ | 3.61 | 13 | −0.11 | 5.77 × 10$^{-3}$ |
| $I_3$ | 4 | 60 | −2.88 | 2.01 × 10$^{-3}$ |
| $I_4$ | 5.29 | 19 | −0.24 | 1.21 × 10$^{-3}$ |
| $I_5$ | 5.57 | 51 | −2.01 | 6.55 × 10$^{-4}$ |
| $I_6$ | 6.08 | 34 | −0.814 | 6.06 × 10$^{-4}$ |
| S | 1 | 60 | −2.88 | 0.52 | whose distances to a user at cell boundary are represented as the six solid lines in FIGS. 17 to 19. Because the received signal powers from the desired base station and the interfering based station vary with user locations, the performance is examined at two extreme user locations for the WBTC system, and three for the NBTC and INBTC systems. As shown in the figures, users A and B are positioned at the cell boundary and the angles from their locations to the main beam of a sectored antenna are 60 degrees and 30 degrees, respectively. In addition, user C is located at the farthest point of a cell in the main beam direction of a sectored antenna.

Compared to users in other cell boundary locations, it is discovered that user A is at the worst position in the WBTC and NBTC systems, and user B is at the worst position in the INBTC system. For users A in the WBTC and NBTC systems, and user B in the INBTC system, Tables I to III, respectively, list the values of $(d_i/R)^{-\gamma} \times 10^{G(\theta i)/10}$, where $d_i/R$ is the normalized distances of the interferers to the cell radio R, and $(d_i/R)^{-\gamma} \times 10^{G(\theta i)/10}$ is the path gain.

TABLE II

|  | $d_i/R$ | $\theta_i$ (deg) | $G(\theta_i)$ (dB) | $(d_i/R)^{-\gamma} \times 10^{G(\theta i)/10}$ |
|---|---|---|---|---|
| $I_1$ | 2.65 | 19 | −1.15 | 1.56 × 10$^{-2}$ |
| $I_2$ | 3.04 | 34 | −3.72 | 4.97 × 10$^{-3}$ |
| $I_3$ | 4.77 | 5 | −0.08 | 1.90 × 10$^{-3}$ |
| $I_4$ | 5.22 | 24 | −1.85 | 8.81 × 10$^{-4}$ |
| $I_5$ | 4.27 | 54 | −9.49 | 3.37 × 10$^{-4}$ |
| $I_6$ | 2.18 | 83 | −23.23 | 2.11 × 10$^{-4}$ |
| S | 0.5 | 60 | −11.37 | 1.17 |

TABLE III

|  | $d_i/R$ | $\theta_i$ (deg) | $G(\theta_i)$ (dB) | $(d_i/R)^{-\gamma} \times 10^{G(\theta i)/10}$ |
|---|---|---|---|---|
| $I_1$ | 3.04 | 34 | −3.72 | 4.97 × 10$^{-3}$ |
| $I_2$ | 4.09 | 12 | −0.46 | 3.21 × 10$^{-3}$ |
| $I_3$ | 3.12 | 43 | −5.97 | 2.66 × 10$^{-3}$ |
| $I_4$ | 4.92 | 15 | −0.72 | 1.44 × 10$^{-4}$ |
| $I_5$ | 5.07 | 50 | −8.12 | 2.33 × 10$^{-4}$ |
| $I_6$ | 4.44 | 76 | −19.02 | 3.21 × 10$^{-5}$ |
| S | 0.87 | 30 | −2.70 | 0.96 |

Substituting these values from Tables I to III into equation (5) with $\omega$=1 (i.e., no shadowing), we find the values of the worse case SIR are 12.99 dB, 16.88 dB, and 18.82 dB for the WBTC, NBTC, and INBTC systems, respectively. For purposes of comparison, Table IV lists the values of SIR for users A, B, and C for these three systems.

TABLE IV

| Location | WBTC | NBTC | INBTC |
|---|---|---|---|
| A | 12.93 | 16.88 | 19.42 |
| B | — | 17.85 | 18.82 |
| C | 18.1 | 19.14 | 19.8 |

This analysis shows that for a reuse factor K=3 and no shadowing, the NBTC system improves by about 4 dB in worst-case SIR over the WBTC system, and the INBTC system further improves by about 2 dB in worstcase SIR over the NBTC system.

The improvement of the INBTC system over conventional systems is attributed in part to the ICA algorithm, which reduces the interference power by arranging the antenna directions of the interfering sources. Specifically, the closer interfering base stations are assigned smaller antenna gains to reduce their impacts, while the farther base stations are given greater antenna gains. From Table III, for example, the nearest two interferers $I_1$, and $I_3$ for the INBTC system, which have distances about 3 times the cell radius, have the normalized antenna gains −3.72 dB and −5.97 dB, respectively, while the farther interferers $I_2$ and $I_4$, are assigned larger antenna gains, −0.46 dB and −0.72 dB, respectively. On the other hand, from Tables I and II, we find that, for the strongest four interferers, $I_2$ to $I_4$, in the WBTC and NBTC systems, the shorter the normalized distance $d_i/R$ of interferers, the larger the impact on the user. As a result, the strongest interferer in the INBTC system has less impact than that in a WBTC and NBTC systems. From Tables I to III, it is also found that the path gain of $I_1$ in the INBTC system is $4.97 \times 10^{-3}$. Since both the strongest two interferers $I_1$ and $I_2$ in the INBTC system have less impact than those in the WBTC and NBTC systems, the SIR performance of the INBTC system exceeds that of the WBTC and NBTC systems.

Figure 21:
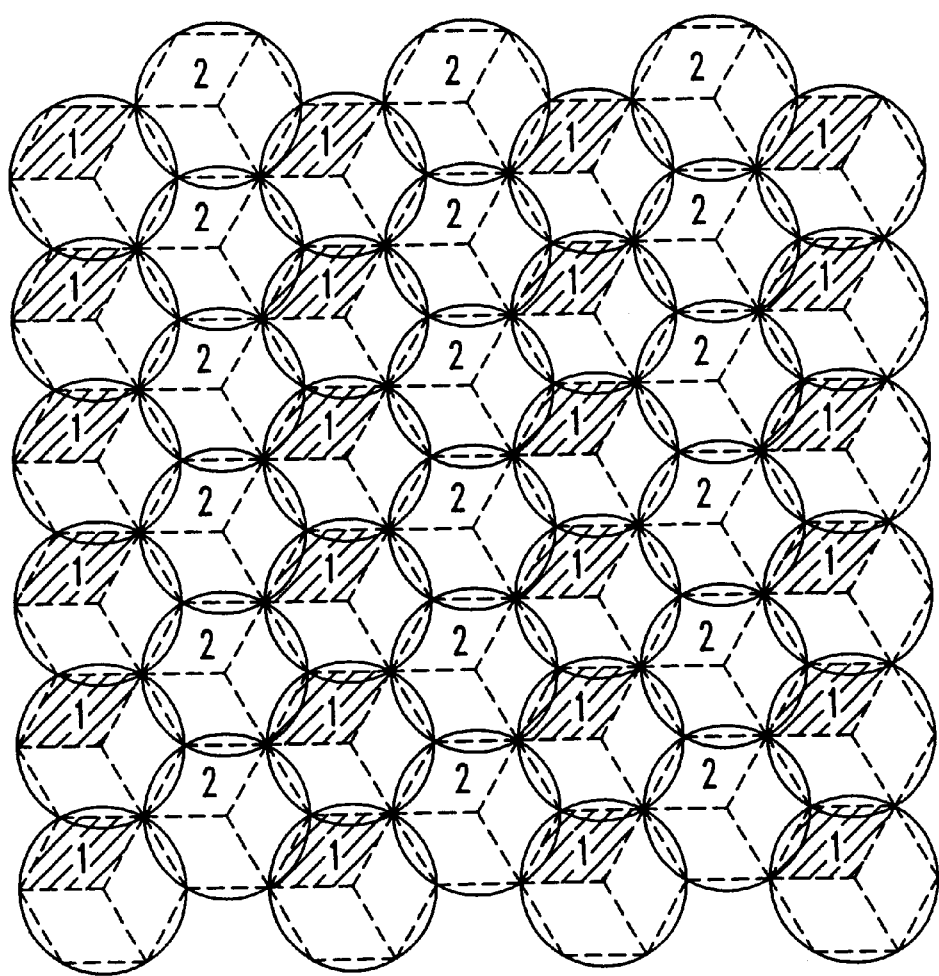
FIG. 21 illustrates the creation of a major co-channel interfering base station adjacent to the desired cell when NBTC and WBTC systems implement a reuse factor of K=2.

Another advantage of the INBTC system occurs when it is necessary to implement a very low reuse factor, such as K=2. In this case, the INBTC architecture can maintain a smaller SIR performance degradation compared to the WBTC and NBTC systems. In the NBTC and WBTC systems, the lowest reuse factor is K=3 to ensure at least a separation of the distance between one cell and a major co-channel interfering base station. By implementing a reuse factor K=2 in the NBTC and WBTC systems, a major co-channel interfering base station adjacent to the desired cell is inevitably created, as shown in FIG. 21. This configuration seriously degrades system performance. Even if site diversity is implemented, a user always encounters an interferer in an adjacent cell, thereby decreasing the site diversity gain.

Figure 20:
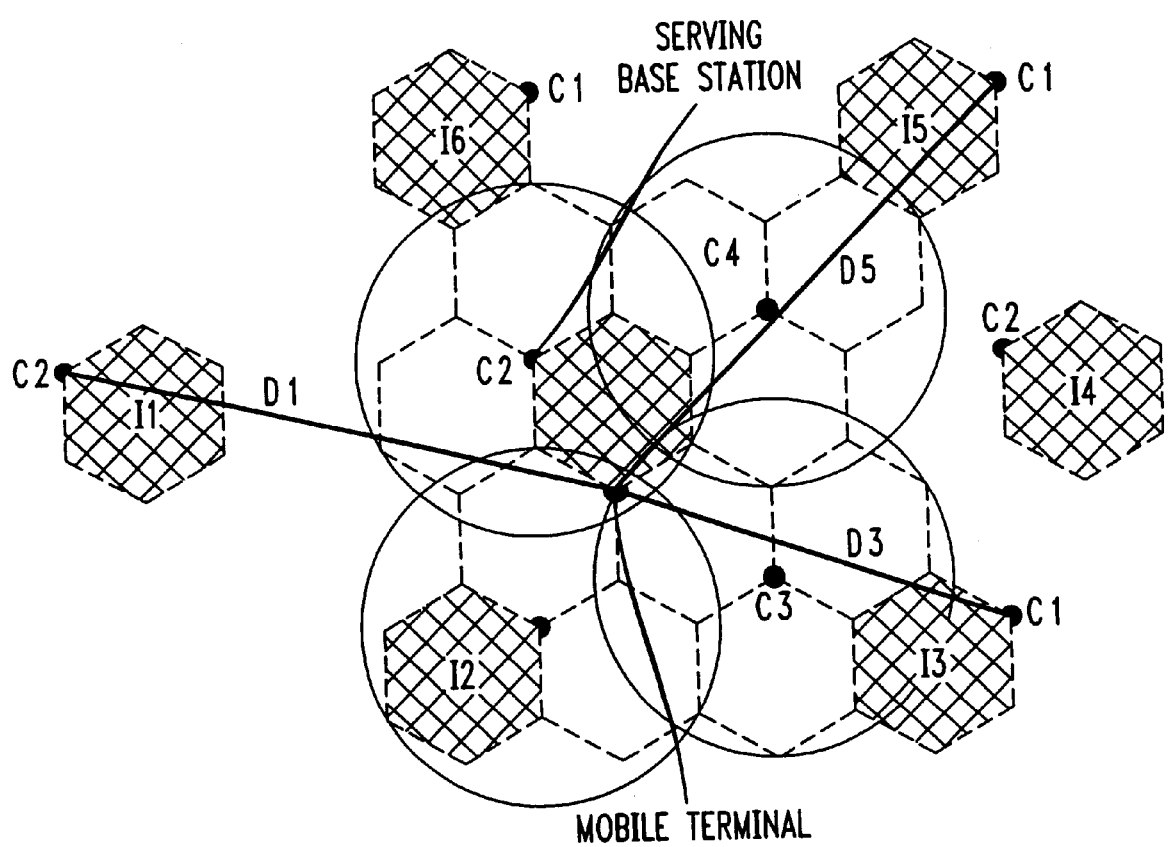
FIG. 20 illustrates a serving base station surrounded by six co-channel interfering base stations $I_1$ to $I_{16}$.

Instead, even with a reuse factor K=2, two adjacent co-channel cells in the INBTC system do not interfere with each other because these two co-channel sectors are pointing in two different directions, as shown in FIG. 9. Specifically, consider a serving base station surrounded by six co-channel interfering base stations, $I_1$ to $I_6$, as shown in FIG. 20. Due to the ICA scheme, the nearest two interferers, $I_2$ and $I_6$, have little impact on the user since backlobe antenna gains are negligible. Two major interferers, $I_1$ and $I_5$, with front lobe antenna gain, are located farther away from the user. For another two interferers, $I_3$ has sidelobe antenna gain, and $I_4$ has backlobe antenna gain. When site diversity is implemented in this scenario, a user can find four neighboring base stations that do not interfere with each other. Consequently, one can expect that, as the reuse factor becomes smaller, the performance degradation in the INBTC system is smaller than that in the WBTC and NBTC systems. This property is demonstrated next through the use of a simulation.

A simulation study was performed for the INTBC system. The simulation platform used invokes the following assumptions:

1. The base-to-mobile (downlink) direction is considered exclusively. In most cases, the downlink is the performance-limiting direction, and therefore is sufficient for study purposes.
2. In conformity with current practice in FDMA and TDMA systems, downlink power control is not considered.
3. The shadow fading components ($\omega_i$, i=0, 1, . . . , n) are assumed to be mutually in dependent. In reality, this may not always be true, since local shadowing for a given user location can affect its paths to all base stations.
4. At least two tiers of co-channel interferers are considered.
5. A fully-loaded condition is considered where assigned channels are constantly used, thus yielding pessimistic results.

Built upon the above assumptions, the simulation platform was used via the following approach:

1. In each trial, the user population is generated randomly in a rectangular coverage area with the cell site layouts of the INBTC, NBTC, and WBTC systems.
2. A cellwrapping technique is used to avoid edge effects.
3. Two kinds of site diversity techniques are adopted to select the serving cell: signal strength measurement-based site diversity (called signal-based site diversity herein); and SIR measurement-based site diversity (called SIR-based site diversity herein).
4. The population of SIR values so obtained has been then used to compute the reliability $P(\lambda_{th})$.

Figure 22:
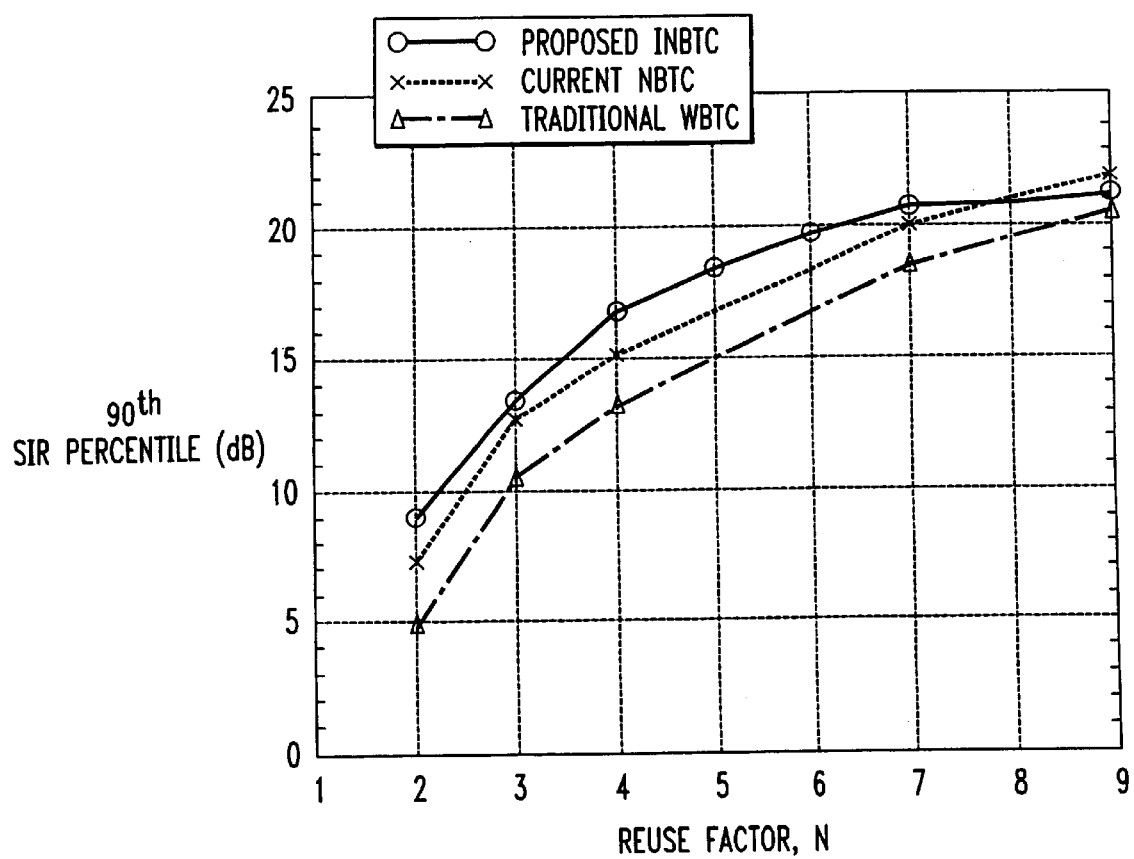
FIG. 22 illustrates the reuse efficiencies of the INBTC, NBTC, and WBTC systems in terms of the 90th SIR percentile.
Figure 23:
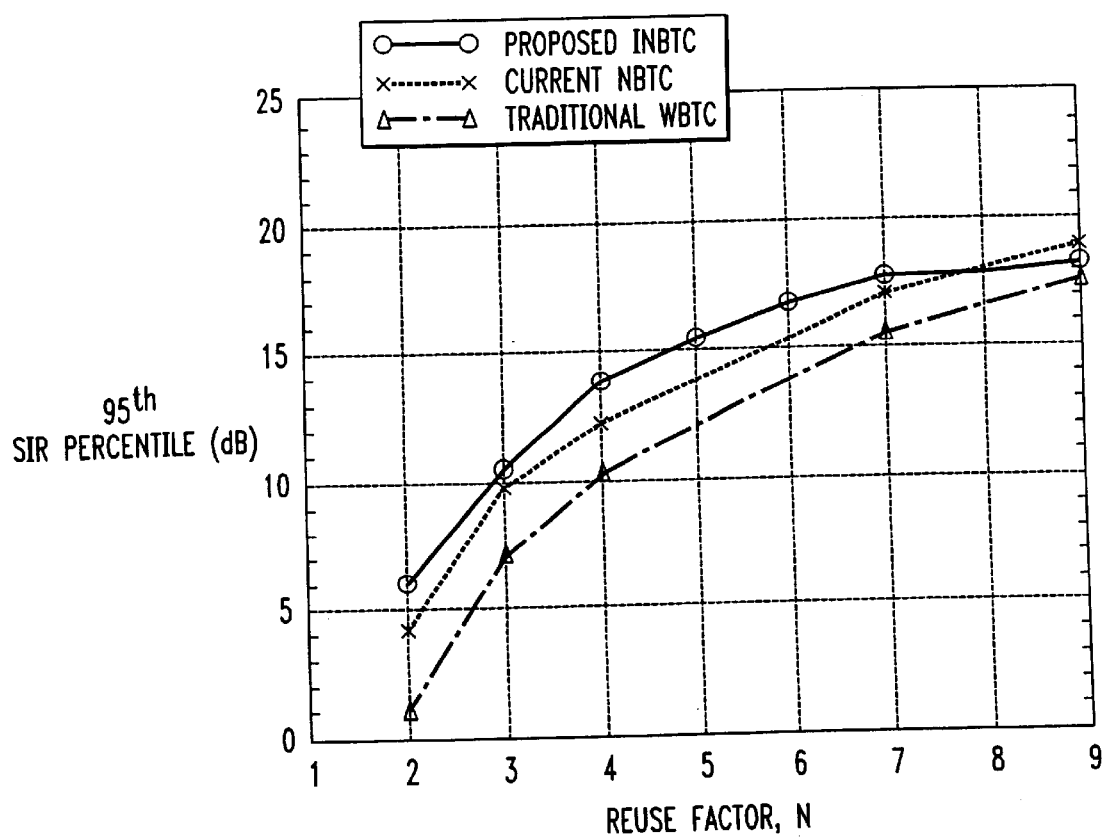
FIG. 23 illustrates the reuse efficiencies of the INBTC, NBTC and WBTC systems in terms of the 95th SIR percentile.

For signal-based site diversity, cell site selection is determined by comparing measurements of signal strength from surrounding base stations. With the shadowing standard deviation $\sigma=8$ dB and the path loss exponent $\gamma=4$, FIG. 22 compares the reuse efficiencies of the INBTC, NBTC, and WBTC systems in terms of the 90th SIR percentile, while FIG. 23 shows the 95th SIR percentiles for the three systems. From the figures, it can be appreciated that the INBTC system provides better tradeoffs between SIR performance and reuse efficiency than the NBTC and WBTC systems, which can be elaborated upon from two different perspectives. First, the INBTC system improves the performance of SIR (or reliability) over the NBTC and WBTC systems for a given reuse factor:

For reuse factors K=3 to 7, the INBTC system improves 3 to 4 dB at the 90th and 95th SIR percentiles compared with the WBTC system, and improves 1 to 2 dB compared with the NBTC system.

For reuse factors K=3 to 7, the 95th SIR percentiles of the INBTC system are closer to the 90th SIR percentiles of the WBTC system. Therefore, for the same reuse efficiency and SIR requirement, the INBTC system improves the reliability to 95% (equivalently, the outage probability is 5%, or half that of the corresponding WBTC system).

Second, the INBTC system improves the capacity over the WBTC and NBTC systems for a given SIR requirement:

The INBTC system can employ a reuse factor K=4 and achieve 17 dB for the 90th SIR percentile. However, the traditional NBTC and WBTC systems require at least K=7 to achieve the same performance. As a result, in this particular case, the INBTC system increases system capacity by 75% over the NBTC and WBTC systems.

By lowering the SIR requirement to less than 10 dB using advanced techniques, such as equalization, frequency hopping and interference cancellation techniques, the INBTC architecture can achieve both high reuse efficiency and high reliability. For example, for a 9dB SIR requirement, as in GSM and PCS-1900, the INBTC system can achieve a very high reuse efficiency (K=2) with 90% reliability, while the NBTC and WBTC systems require at least K=3 to achieve the same performance, thus causing loss of trunking efficiency and network capacity. If the SIR requirement can be lowered to 6 dB, then the INBTC system with K=2 can reach 95% reliability.

TABLE V

| N | 1% | 5% | 10% |
|---|------|-------|-------|
| 2 | 5.00 | 8.75 | 11.05 |
| 3 | 8.97 | 12.8 | 15.00 |
| 4 | 12.45 | 16.15 | 18.3 |
| 7 | 17.25 | 20.85 | 22.95 |

Figure 24:
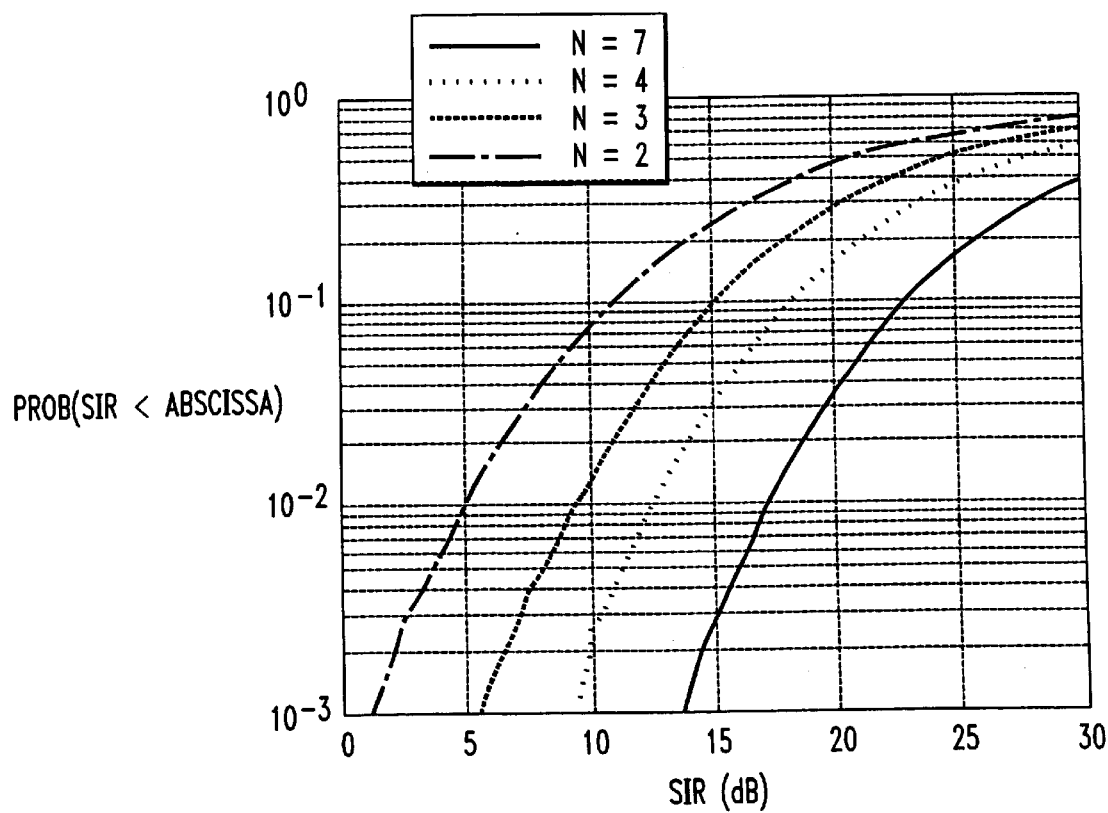
FIG. 24 illustrates the performance of an INBTC system with SIR-based site diversity for reuse factors K=2 to 7.

FIG. 24 shows the performance of the INBTC system with SIR-based site diversity for reuse factors K=2 to 7 under the same condition described above. Using SIR measurement techniques, SIR-based site diversity techniques can further improve system performance. Based on FIG. 24, Table V lists the values of SIR corresponding to outage probabilities of 1%, 5% an 10%. Comparing the table with FIGS. 22 and 23, it can be appreciated that:

SIR-based site diversity improves the SIR performance of the INBTC system by 2 to 3 dB over signal-based diversity.

The higher the percentile requirement, the higher the gain of SIR-based site diversity over signal-based site diversity. The gain is 2 dB and 3 dB at the 90th and 95th percentiles, respectively.

Figure 25:
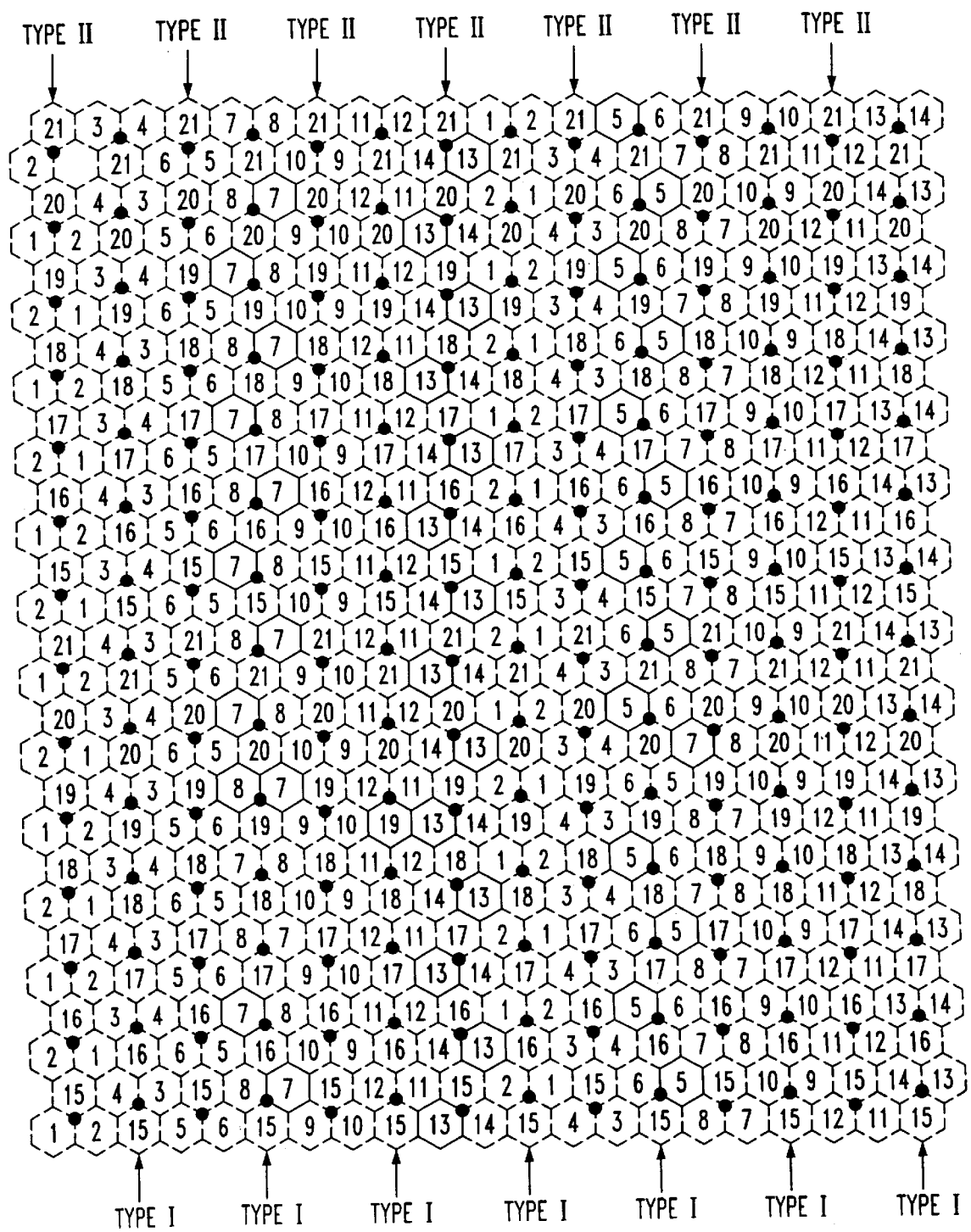
FIG. 25 is a frequency reuse pattern of K=7 using NBTC in accordance with one embodiment of the present invention.

FIG. 25 illustrates a frequency reuse pattern of K=7 in accordance with one embodiment of the present invention. This embodiment of the invention utilizes 21 channel sets, wherein the repeat pattern of the whole channel sets is formed in a cluster of 196 cells (or 588 sectors), within which the total channel sets available to the system are reused 28 times. Each sector is assigned a channel set in accordance with the ICA scheme described above. It is worthy to note that the ICA scheme ensures that any two co-channel sectors are separated by at least a sector and the main beams of the nearest two co-channel sectors are pointing in two different directions so that they will not interfere with each other.

Although various embodiments are specifically illustrated and described herein, it will be appreciated that modifications and variations of the present invention are covered by the above teachings and within the purview of the appended claims without departing from the spirit and intended scope of the invention. For example, although specific angles for the main beam of the base station antennas are given, it can be appreciated that various angles fall within the scope of the invention. Similarly, although ranges of beamwidths for use with the base stations antennas are given, it can be appreciated that any beamwidth approximating the hypothetical cell contours given for various embodiments of the present invention also falls within the scope of the invention.

What is claimed is:

1. A method for communications resource allocation for a wireless communications system having a total system bandwidth, comprising the steps of:

dividing a service area into a plurality of sectors;

positioning a first set of antennas within a first set of sectors, said first set of antennas having main beams set a first set of angles, and where each antenna of said first set of antennas corresponds to a sector within said first set of sectors;

positioning a second set of antennas within a second set of sectors adjacent to said first set of sectors, said second set of antennas having main beams set a second set of angles, and where each antenna of said second set of antennas corresponds to a sector within said second set of sectors;

separating the total system bandwidth into a plurality of channel sets;

assigning each sector a channel set in a channel repeat pattern that provide s a reuse factor of K, where K is at least equal to 2; and wherein K is defined by the following equation:

$$K=\alpha/(\beta\times\gamma)$$

where α is the number of sectors in said channel repeat pattern; β is a number of sectors per set; and γ is a number of times a channel set is used in said pattern.

2. The method of claim 1 wherein said first set of angles are 30 degrees, 150 degrees and 270 degrees, and said second set of angles are 90 degrees, 210 degrees and 330 degrees.

3. The method of claim 2 wherein said assigning comprises:

separating each channel set into one of three categories;

assigning channel sets for a first category to those sectors having antennas set at said angles of 210 degrees and 330 degrees;

assigning channel sets for a second category to those sectors having antennas set at said angles of 30 degrees and 150 degrees; and assigning channel sets for a third category to those sectors having antennas set at said angles of 90 degrees and 270 degrees.

4. The method of claim 3 wherein any sectors assigned the same channel set are separated by at least one sector.

5. The method of claim 4 wherein the total system bandwidth is separated into 3K channel sets.

6. A method for communications resource allocation for a wireless communications system having a total system bandwidth, comprising the steps of:

dividing a service area into a plurality of sectors;

positioning a first set of antennas within a first set of sectors, said first set of antennas having main beams set a first set of angles, and where each antenna of said first set of antennas corresponds to a sector within said first set of sectors;

positioning a second set of antennas within a second set of sectors adjacent to said first set of sectors, said second set of antennas having main beams set a second set of angles, and where each antenna of said second set of antennas corresponds to a sector within said second set of sectors;

separating the total system bandwidth into a plurality of channel sets;

assigning each sector a channel set in a channel repeat pattern that provides a reuse factor of K, where K is at least equal to 2; and determining whether K is an even or odd integer;

forming said reuse pattern using a cluster of $4N^2$ set of sectors, within which each channel set is reused 4N times, if said K is an odd integer; and forming said reuse pattern using a cluster of $N^2$ set of sectors, within which each channel set is used N times, if said K is an even integer.

7. A communications system having a service area divided into a plurality of sectors, and also having a total system bandwidth separated into a plurality of channel sets, comprising:

a first set of base station antennas within a first set of sectors, said first set of antennas having main beams set a first set of angles, and where each antenna of said first set of antennas corresponds to a sector within said first set of sectors;

a second set of base station antennas within a second set of sectors adjacent to said first set of sectors, said second set of antennas having main beams set a second set of angles, and where each antenna of said second set of antennas corresponds to a sector within said second set of sectors;

at least one transceiver coupled to each of said first and second set of antennas, said transceiver communicating signals using an assigned channel set that is part of a channel repeat pattern that provides a reuse factor of K, where K is at least equal to 2, for the system; and wherein K is defined by the following equation:

$$K=\alpha/(\beta\times\gamma)$$

where $\alpha$ is the number of sectors in said channel repeat pattern; $\beta$ is a number of sectors per set; and $\gamma$ is a number of times a channel set is used in said pattern.

8. The apparatus of claim 7, wherein said first set of angles are 30 degrees, 150 degrees and 270 degrees, and said second set of angles are 90 degrees, 210 degrees and 330 degrees.

9. The apparatus of claim 8, wherein the total system bandwidth is separated into 3K channel sets.

* * * * *